US012705154B2

(12) United States Patent
Mukherjee et al.

(10) Patent No.: US 12,705,154 B2
(45) Date of Patent: Aug. 11, 2026

(54) REAL-TIME ANOMALY PREDICTION USING EXTRAPOLATED TELEMETRY DATA

(71) Applicant: Bank of America Corporation, Charlotte, NC (US)

(72) Inventors: Maharaj Mukherjee, Poughkeepsie, NY (US); Carl Benda, Charlotte, NC (US); Colin Murphy, Charlotte, NC (US); Rahul Uniyal, Uttarakhand (IN); Viraj Shah, Mumbai (IN); Vijay Yarabolu, Hyderabad (IN); Aditya Krishnanand Chaubey, Mumbai (IN); Duy Minh Pham, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 134 days.

(21) Appl. No.: 18/796,529

(22) Filed: Aug. 7, 2024

(65) Prior Publication Data

US 2026/0044426 A1 Feb. 12, 2026

(51) Int. Cl.
*G06F 11/30* (2006.01)

(52) U.S. Cl.
CPC ...... *G06F 11/3072* (2013.01); *G06F 11/3089* (2013.01); *G06F 2201/805* (2013.01)

(58) Field of Classification Search
CPC ............. G06F 11/3072; G06F 11/3065; G06F 11/3089; G06F 2201/805; G06N 20/00
USPC .......................................................... 709/224
See application file for complete search history.

(56) References Cited

U.S. PATENT DOCUMENTS 10,404,569 B2 9/2019 Hershey et al.
11,005,872 B2 5/2021 Dherange et al.
11,126,167 B2 9/2021 SayyarRodsari et al.
11,194,691 B2 12/2021 Dherange et al.
11,544,585 B2 * 1/2023 Ahringer .................. G06N 5/04
(Continued)

FOREIGN PATENT DOCUMENTS

CN 113190842 A 7/2021
CN 118301011 A * 7/2024 ............. G06N 20/00
CN 118940854 A * 11/2024 ............. G06Q 50/04

*Primary Examiner* — Ruolei Zong
(74) *Attorney, Agent, or Firm* — Banner & Witcoff, Ltd.

(57) ABSTRACT

Systems and methods are disclosed for real-time anomaly prediction using near real-time data. The invention addresses delays in telemetry data collection from infrastructure components, by collecting metrics and logging this data in real-time. Extracted logged data undergoes initial analysis to identify patterns and anomalies, followed by cleaning to remove noise and errors. Feature engineering enhances the data, creating or modifying features to improve machine learning model performance. The system calculates weighted means of previous data values and computes first and second-order differences to capture immediate changes and trends. These calculations adjust the extrapolated value to accurately reflect current conditions. The adjusted data is integrated into the dataset and validated. The validated data trains and tests a machine learning model, which is then finalized and deployed for real-time anomaly detection. This system ensures accurate and timely anomaly prediction, enabling automated incident response to maintain the reliability and performance of infrastructure components.

20 Claims, 13 Drawing Sheets

(56) References Cited

U.S. PATENT DOCUMENTS

| | | | |
|---|---|---|---|
| 11,747,801 | B2 | 9/2023 | SayyarRodsari et al. |
| 11,893,645 | B2 | 2/2024 | Przechocki et al. |
| 11,962,484 | B1 * | 4/2024 | Jain .......................... H04L 43/50 |
| 2017/0339178 | A1 * | 11/2017 | Mahaffey ............ G06F 11/3006 |
| 2020/0387797 | A1 | 12/2020 | Ryan et al. |
| 2021/0011467 | A1 | 1/2021 | SayyarRodsari et al. |
| 2021/0064458 | A1 * | 3/2021 | Rathinasabapathy ........................ G06F 11/0709 |
| 2022/0262104 | A1 | 8/2022 | Salman et al. |
| 2022/0382611 | A1 * | 12/2022 | Kapish ................ G06F 11/0709 |
| 2023/0106369 | A1 * | 4/2023 | Flynn ..................... G06N 20/00 718/103 |
| 2023/0336447 | A1 * | 10/2023 | Kommula ........... H04L 41/0681 |
| 2024/0184682 | A1 * | 6/2024 | Vudathu ............... G06F 11/004 |
| 2024/0340225 | A1 * | 10/2024 | Pease ..................... G06N 20/00 |
| 2024/0340314 | A1 * | 10/2024 | Radon ................. H04L 63/1425 |
| 2024/0403099 | A1 * | 12/2024 | Verma ................. G06F 9/45558 |

* cited by examiner

Data Flow Diagram

Sequence Diagram

System Architecture Diagram

Component Diagram

Sequence Diagrams

Sequence Diagrams (Cont'd)

Chart of Sample Telemetry Data

| Number | Telemetry Attribute Name | Metric Description | Sample Metric Value |
|---|---|---|---|
| 1100 | CPU Utilization | Percentage of CPU capacity in use. | 0.35 |
| 1102 | Memory Usage | Amount of RAM being used. | 8 GB used out of 16 GB |
| 1104 | Network Traffic (Incoming) | Data received by the network interface. | 10 Mbps |
| 1106 | Network Traffic (Outgoing) | Data transmitted by the network interface. | 5 Mbps |
| 1108 | Number of Processes | Total number of running processes. | 120 active processes |
| 1110 | Server Load (1 min) | Average system load over the last minute. | Load Average - 5.5 Seconds |
| 1112 | Network Latency | Time taken for data to travel between points on a network. | 1.65 milliseconds |
| 1114 | Disk Read Speed | Speed at which data is read from disk. | 150 MB/s |
| 1116 | Disk Write Speed | Speed at which data is written to disk. | 80 MB/s |
| 1118 | Response Time per KB Data | Time taken to process each kilobyte of data. | 50 ms |
| 1120 | Transactions per Second | Number of transactions processed per second. | 200 |
| 1122 | Bandwidth Usage | Amount of network bandwidth being utilized. | 1,073,741,824 Kilo Bytes |
| 1124 | Temperature | Temperature of a hardware component. | 42.3°C |
| 1126 | Application Response Time | Time taken for an application to respond to a request. | 120 ms |
| 1128 | Application Throughput | Rate at which an application processes data. | 100 requests per second |
| 1130 | Disk Read Operations | Number of read operations performed on disk. | 2000 per second |
| 1132 | Disk Write Operations | Number of write operations performed on disk. | 1500 per second |
| 1134 | Disk Input/Output Operations per Second | Number of input/output operations per second on disk. | 1200 |
| 1136 | Network Packets Received per Second | Number of packets received per second. | 1500 |
| 1138 | Network Packets Transmitted per Second | Number of packets transmitted per second. | 800 |
| 1140 | Fan Speed | Speed of a fan in a system. | 1550 RPM |
| 1142 | Incoming Network Traffic | Data received by a network interface. | 15 Mbps |
| 1144 | Outgoing Network Traffic | Data transmitted by a network interface. | 8 Mbps |
| 1146 | Power Consumption | Amount of power being consumed. | 155 Watts |
| 1148 | Disk Space | Amount of storage space available or used. | 150/500 GB |

FIG. 11

REAL-TIME ANOMALY PREDICTION USING EXTRAPOLATED TELEMETRY DATA

TECHNICAL FIELD

The inventions disclosed herein pertain to the field of Electrical Computers and Digital Processing Systems, specifically relating to error detection/correction and fault detection/recovery. It relates to systems and methods for identifying and correcting errors within digital data and ensuring the reliability and integrity of data processing systems. The present inventions focus on real-time anomaly prediction and incident detection using near real-time data, thereby addressing the fault detection and recovery aspects crucial for maintaining the operational integrity of network infrastructure components.

DESCRIPTION OF THE RELATED ART

Detecting outages of infrastructure components such as firewalls, switches, servers, and storage devices is crucial for maintaining the operational integrity of a network. One of the primary challenges in this context is the significant delay in collecting telemetry data from sensors or agents connected to each hardware component. This delay, which can range from one to two hours, undermines the effectiveness of incident prediction engines that are designed to predict anomalies or incidents in real-time. When there is a delay in data collection, the incident prediction engine is forced to operate with outdated information, making it difficult to accurately predict and respond to potential issues in a timely manner. This latency can result in delayed incident responses, leading to prolonged downtime and increased operational and reputational risks for organizations.

The delay in telemetry data collection is primarily due to the time it takes to transmit data from the primary source to the log tools such as Splunk. Once the data is collected by sensors, it needs to be transmitted over the network to a central repository where it is logged and analyzed. This process involves multiple steps, including data aggregation, transmission, and logging, each of which can introduce latency. Additionally, network congestion and bandwidth limitations can further exacerbate the delay, resulting in significant lags between the actual occurrence of an event and its logging. As a result, the data available to the incident prediction engine is not reflective of the current state of the infrastructure, limiting its ability to detect and respond to incidents in real-time.

The lack of real-time data poses several challenges for network administrators and IT professionals. Without up-to-date telemetry data, it becomes difficult to monitor the health and performance of infrastructure components accurately. This can lead to missed detection of critical issues such as hardware failures, network bottlenecks, or security breaches. When such incidents go unnoticed or are detected late, they can cause significant disruptions to business operations, leading to financial losses and damage to the organization's reputation. Moreover, the inability to predict incidents in real-time hampers the effectiveness of automated incident response systems, which rely on timely and accurate data to take corrective actions.

Another issue related to the delay in telemetry data collection is the increased difficulty in performing root cause analysis. When an incident occurs, IT professionals need to analyze historical data to identify the underlying cause of the problem. However, if the data is delayed, the analysis may be based on incomplete or outdated information, making it challenging to pinpoint the root cause accurately. This can lead to incorrect diagnoses and ineffective remediation efforts, further prolonging the resolution time and increasing the risk of recurrence.

Furthermore, the delay in data collection affects the ability to perform proactive maintenance and optimization of infrastructure components. Proactive maintenance involves monitoring the performance of hardware and software systems to identify potential issues before they escalate into critical problems. This requires real-time access to telemetry data to detect early warning signs and take preventive measures. However, with delayed data, proactive maintenance becomes less effective, as potential issues may go unnoticed until they become severe enough to cause significant disruptions.

The delay in telemetry data collection also impacts the accuracy of predictive analytics and machine learning models used for incident prediction. These models rely on historical and real-time data to learn patterns and make predictions about future events. When the data is delayed, the models are trained on outdated information, reducing their accuracy and effectiveness. This can result in false positives or negatives, leading to unnecessary alerts or missed detection of critical incidents. Consequently, IT professionals may lose trust in the predictive capabilities of these models, further diminishing their value.

In addition to the technical challenges, the delay in telemetry data collection poses operational challenges for organizations. IT teams need to allocate additional resources to manually monitor and analyze data to compensate for the lack of real-time insights. This increases the workload on IT staff and diverts their attention from other critical tasks. Moreover, the need for manual intervention reduces the overall efficiency and responsiveness of the incident management process, increasing the time it takes to detect and resolve issues.

The lack of real-time data also complicates the implementation of automated incident response systems. These systems are designed to automatically trigger predefined actions in response to detected anomalies or incidents. However, without real-time data, the accuracy and reliability of these automated responses are compromised. This can lead to inappropriate or delayed actions, exacerbating the impact of incidents on business operations. As a result, organizations may be hesitant to fully rely on automation, preferring manual intervention despite its limitations.

Overall, the delay in collecting telemetry data from infrastructure components presents a significant barrier to achieving real-time incident prediction and response. It undermines the effectiveness of monitoring, root cause analysis, proactive maintenance, predictive analytics, and automated incident response systems. Addressing this challenge is crucial for enhancing the operational resilience and reliability of IT infrastructure, minimizing downtime, and protecting the organization's reputation and financial performance.

There has been a long-felt and unmet need for a solution that can bridge the gap between near real-time and real-time data availability for incident prediction engines. Traditional approaches have struggled to overcome the inherent delays in data collection and transmission, leaving organizations vulnerable to unexpected outages and disruptions. An effective solution that can accurately predict incidents in real-time using near real-time data would greatly enhance the ability of IT professionals to maintain the health and performance of their infrastructure, ultimately leading to improved business continuity and reduced risk.

SUMMARY OF THE INVENTION

The present inventions provide a solution to the problem of delayed telemetry data collection from infrastructure components, which impedes real-time incident prediction and response. This solution involves analyzing the influential factors of infrastructure devices and building a forecaster model that evaluates the behavior of these components in real-time. The forecaster model generates the missing telemetry data up to the point of incident prediction, ensuring that the incident prediction engine operates with the most current data available. This process begins with the collection of raw telemetry data from various infrastructure components such as firewalls, switches, servers, and storage devices. The data includes metrics like CPU usage, memory consumption, network traffic, and error rates, which are crucial for monitoring the health and performance of these components.

Once the raw telemetry data is collected, it is logged in real-time into a logging system. This ensures that every data point is recorded as it occurs, capturing the continuous stream of telemetry data. The logged data is then extracted from the real-time log for further processing. This involves querying the log system to retrieve the relevant data sets required for analysis. The extracted data undergoes initial analysis to understand its structure, trends, and any anomalies that might already be present. This analysis helps in identifying patterns and outliers in the data, which are essential for accurate incident prediction.

After the initial analysis, the data is cleaned to remove any noise, irrelevant information, or errors. This step is crucial for ensuring the quality of data used in subsequent steps. Cleaning might involve handling missing values, smoothing outliers, and normalizing data. Important features are then engineered from the cleaned data. Feature engineering involves creating new features or modifying existing ones to improve the performance of the machine learning model. Examples include calculating the moving average, trend lines, or interaction terms between different metrics. The processed data is ingested into the system for further analysis and modeling. This involves loading the data into a data warehouse or a similar storage solution where it can be easily accessed for training machine learning models.

The main repository where the ingested data is stored is often a high-performance database or data lake that supports large-scale data storage and retrieval. Analyzing any gaps in the time series data to identify missing data points is a critical step. This step checks for periods where no data was collected and determines the impact of these gaps on the analysis. Influencer factor analysis examines factors that influence the behavior of the infrastructure components. Influencer factors might include external conditions, configuration changes, or interdependencies between components. Forecasting the influential factors based on historical and real-time data involves using statistical or machine learning models to predict future values of these factors.

Imputing the missing influencer factors in the dataset to make it complete is the next step. This step fills in the gaps identified in the influencer factors using imputation techniques such as mean substitution, regression imputation, or more sophisticated predictive models. Using the imputed influencer factors to forecast the missing time series data points involves creating a model that predicts the missing values based on the imputed factors and known data points. The forecasted time series data is then ingested back into the system to ensure a complete dataset. This step integrates the predicted data with the existing dataset to maintain continuity. Further analysis of key factors that significantly impact the system's performance involves identifying which factors are most predictive of anomalies or outages.

Relevant data for model training and testing is then extracted. This involves selecting the features and labels that will be used to train the machine learning models. The machine learning model is trained using the extracted data. This step involves feeding the data into the model and adjusting the model parameters to learn the underlying patterns. Testing the trained model to evaluate its performance involves using a separate validation dataset to assess how well the model generalizes to new, unseen data. Assessing the accuracy of the model includes calculating accuracy metrics such as precision, recall, F1 score, or mean absolute error to determine the model's performance.

If the model accuracy is not satisfactory, hyperparameters are adjusted. Hyperparameters are the model parameters that are set before the training process begins, such as learning rate, number of trees in a random forest, or the number of layers in a neural network. Tuning the data to improve the model performance might involve feature selection, feature scaling, or creating synthetic data to balance the dataset. Checking if the desired accuracy is achieved involves a continuous iteration of adjusting hyperparameters and tuning data until the model meets the accuracy requirements.

The model is finalized once it meets the accuracy requirements. This step involves fixing the model parameters and preparing it for deployment. The finalized model is used to classify anomalies in the data. The model predicts whether a given data point represents a normal state or an anomaly. If an anomaly is detected, the anomaly is classified, and appropriate actions are taken. By following this detailed process, the system can detect and forecast infrastructure anomalies in real time, providing robust and accurate predictions to enable automated incident responses. This ensures that the incident prediction engine operates efficiently, maintaining the system's operational integrity and preventing potential losses.

In another embodiment, the present invention offers a further approach to address the delay in telemetry data collection from infrastructure components, which hinders real-time incident prediction. In this embodiment, the invention utilizes neighboring values to extrapolate to the current time, ensuring that the incident prediction engine has the most up-to-date information. This method involves using the weighted mean of a certain number of previous values, where the weights are the inverse of the distance from the current value. This approach ensures that more recent data points have a greater influence on the extrapolated value, providing a more accurate and timely representation of the current state of the infrastructure components.

To enhance the accuracy of the extrapolated data, the invention also considers the first-order differences between consecutive previous values. These differences represent the variation from the previous value and its own trends. By calculating the weighted mean of these first-order differences, the invention can better understand the immediate changes in the telemetry data, allowing for a more precise adjustment of the extrapolated value. The weights, being the inverse of the distance from the current value, ensure that recent changes are given more significance, reflecting the latest trends and variations.

Additionally, the invention incorporates the second-order differences between consecutive previous values. These differences represent the variation in the rate of change of the telemetry data. By analyzing these second-order differences and computing their weighted mean, the invention captures the acceleration or deceleration in the data trends.

This information is crucial for accurately adjusting the extrapolated value, as it provides insights into the dynamics of the data. The use of inverse distance weighting ensures that recent variations are more heavily weighted, aligning the extrapolated value with the latest data behavior.

The first-order, second-order, and any higher-order differences are utilized to fine-tune the extrapolated value. Higher-order differences, if necessary, provide additional layers of adjustment, capturing more complex data patterns. By integrating these differences into the extrapolation process, the invention achieves a high level of precision in predicting the current telemetry data. This multi-layered approach ensures that the incident prediction engine operates with near real-time data, despite the inherent delays in data collection.

Once the extrapolated value is computed, it is integrated into the dataset, filling the gap created by the delayed telemetry data. This integration ensures continuity in the data stream, allowing the incident prediction engine to function as if it had real-time access to the telemetry data. The process is repeated continuously, updating the extrapolated values as new data points become available. This continuous updating mechanism ensures that the incident prediction engine always operates with the most current and accurate data.

The invention also includes mechanisms for validating the extrapolated data. By comparing the extrapolated values with the actual telemetry data once it becomes available, the system can assess the accuracy of the extrapolation process. This validation step is crucial for fine-tuning the weighting mechanisms and adjusting the parameters used in the extrapolation. Continuous validation and adjustment ensure that the system maintains high accuracy over time, adapting to any changes in the data patterns or infrastructure behavior.

Furthermore, the invention can adapt to different types of telemetry data and infrastructure components. Whether the data pertains to CPU utilization, memory usage, network traffic, or error rates, the extrapolation method can be customized to account for the specific characteristics and trends of each metric. This adaptability makes the invention suitable for a wide range of infrastructure monitoring applications, providing a robust solution for real-time incident prediction across diverse environments.

The invention also supports scalability, allowing it to handle large-scale infrastructure environments with numerous components and data streams. The weighted mean and difference calculations are computationally efficient, enabling the system to process vast amounts of data in real-time. This scalability ensures that the invention can be deployed in complex network environments, maintaining high performance and accuracy even as the number of monitored components increases.

In essence, the invention transforms near real-time telemetry data into a reliable basis for real-time incident prediction. By leveraging the weighted mean of previous values and their differences, the system accurately extrapolates the current state of the infrastructure components, filling the gaps caused by data collection delays. This approach not only enhances the accuracy of incident prediction but also enables automated incident response, reducing operational and reputational risks for organizations.

There has been a long-felt and unmet need for a solution that can bridge the gap between near real-time and real-time data availability for incident prediction engines. Traditional approaches have struggled to overcome the inherent delays in data collection and transmission, leaving organizations vulnerable to unexpected outages and disruptions. An effective solution that can accurately predict incidents in real-time using near real-time data would greatly enhance the ability of IT professionals to maintain the health and performance of their infrastructure, ultimately leading to improved business continuity and reduced risk.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

In some arrangements, a method for real-time anomaly prediction using near real-time data comprises the following steps. A sensor collects raw telemetry data from various infrastructure components including firewalls, switches, servers, and storage devices. This data includes metrics such as CPU usage, memory consumption, network traffic, and error rates. A logging system logs the collected raw telemetry data in real-time to capture a continuous stream of telemetry data. A data extraction module extracts the logged telemetry data from the real-time log for further processing. A data analysis module performs initial analysis on the extracted telemetry data to identify structure, trends, and any existing anomalies. A data cleaning module cleans the telemetry data to remove noise, irrelevant information, and errors, including handling missing values, smoothing outliers, and normalizing data.

A feature engineering module performs feature engineering on the cleaned telemetry data to create or modify features that improve the performance of a machine learning model. This includes calculating moving averages, trend lines, or interaction terms between different metrics. A data ingestion module ingests the processed telemetry data into a data warehouse or similar storage solution. A time gap analysis module analyzes gaps in the time series telemetry data to identify and evaluate the impact of missing data points.

An influencer factor analysis module performs influencer factor analysis on the telemetry data to identify factors influencing the behavior of the infrastructure components. A forecasting module forecasts the identified influencer factors based on historical and real-time telemetry data. An imputation module imputes the missing influencer factors in the dataset to make it complete using imputation techniques. The forecasting module further forecasts the missing time series telemetry data points based on the imputed influencer factors and known data points.

The data ingestion module further ingests the forecasted time series telemetry data back into the system to maintain a continuous dataset. A key factor analysis module performs key factor analysis to identify factors significantly impacting system performance. The data extraction module further extracts relevant telemetry data for training and testing a machine learning model. A machine learning model is trained using the extracted telemetry data to learn underlying patterns. A testing module tests the trained machine learning model to evaluate its performance using a separate validation dataset.

An accuracy assessment module assesses the accuracy of the machine learning model using metrics such as precision, recall, F1 score, or mean absolute error. A hyperparameter adjustment module adjusts hyperparameters of the machine learning model if the desired accuracy is not achieved. A data tuning module tunes the telemetry data to improve model performance, including feature selection, feature scaling, and creating synthetic data. A model finalization module finalizes the machine learning model once the desired accuracy is achieved. The finalized machine learning model classifies anomalies in the telemetry data to predict whether a given data point represents a normal state or an anomaly.

In some arrangements, the telemetry data collected by the sensor includes additional metrics such as disk usage, I/O operations, and latency from the infrastructure components. This comprehensive data collection allows for a more detailed and accurate analysis of the infrastructure's performance and potential issues.

In some arrangements, the data cleaning module is configured to handle missing values using advanced imputation techniques such as k-nearest neighbors imputation, multiple imputation by chained equations (MICE), or deep learning-based imputation models. These sophisticated methods ensure that the cleaned data is of high quality and ready for further analysis and modeling.

In some arrangements, the feature engineering module is further configured to create composite features that capture interactions between multiple metrics, such as CPU-memory interaction terms or network-disk usage correlation features. By engineering these complex features, the model's ability to predict anomalies is significantly enhanced.

In some arrangements, the calculation module is configured to compute the weighted mean using a dynamically adjustable window size based on the variability of the telemetry data. This approach ensures that the weighted mean adapts to changing data patterns, providing a more accurate baseline for extrapolation.

In some arrangements, the computation module is further configured to compute first-order differences between consecutive previous telemetry data values and their weighted mean. This technique helps to determine the variation from the previous value and its own trends, minimizing the impact of outliers and noisy data points.

In some arrangements, the computation module is also configured to compute second-order differences using a smoothing algorithm to capture long-term trends and reduce the influence of short-term fluctuations. This step provides a more accurate understanding of the acceleration or deceleration in data trends.

In some arrangements, the adjustment module is configured to incorporate higher-order differences if necessary, to capture more complex patterns and behaviors in the telemetry data. This approach ensures that the extrapolated value accurately reflects the current state of the infrastructure components.

In some arrangements, the validation module is configured to use a feedback loop to continuously improve the weighting mechanisms and extrapolation parameters based on the validation results. This adaptive mechanism ensures the system evolves with changing data patterns, maintaining high accuracy in its predictions.

In some arrangements, the classification by the finalized machine learning model further includes generating detailed reports and alerts, and triggering automated incident response actions based on the classification results. This comprehensive system helps to prevent potential operational and reputational losses by ensuring continuous monitoring and protection of the infrastructure components.

In some arrangements, a system for real-time anomaly prediction using near real-time data comprises a plurality of sensors configured to collect telemetry data from various infrastructure components, including firewalls, switches, servers, and storage devices. These sensors capture metrics such as CPU usage, memory consumption, network traffic, and error rates, providing a comprehensive data set for analysis.

In some arrangements, the system includes a logging system configured to log the collected telemetry data in real-time, creating a continuous record of the telemetry data. This real-time logging ensures that every data point is captured as it occurs, maintaining an accurate and up-to-date data stream.

In some arrangements, a data extraction module is configured to extract the logged telemetry data from the real-time log for further analysis and processing. This extraction is essential for isolating relevant data sets needed for subsequent steps in the anomaly prediction process.

In some arrangements, the system features a data analysis module configured to analyze the extracted telemetry data to identify patterns, trends, and any existing anomalies. This initial analysis helps to understand the data structure and detect any early signs of issues.

In some arrangements, a data cleaning module is included to clean the telemetry data by removing noise, irrelevant information, and errors. This module handles missing values, smooths outliers, and normalizes data, ensuring high-quality data for further analysis.

In some arrangements, the system incorporates a feature engineering module configured to perform feature engineering on the cleaned telemetry data. This module creates or modifies features that enhance the performance of a machine learning model, including calculating moving averages, trend lines, or interaction terms between different metrics.

In some arrangements, a calculation module is configured to calculate the weighted mean of a plurality of previous telemetry data values, where the weights are the inverse of the distance from the current time. This calculation provides a baseline value for extrapolation, essential for accurate anomaly prediction.

In some arrangements, the system includes a computation module configured to compute first-order differences between consecutive previous telemetry data values and their weighted mean. This step helps to determine the variation from the previous value and its own trends, capturing immediate changes in the data.

In some arrangements, the computation module is also configured to compute second-order differences between consecutive previous telemetry data values and their weighted mean. This computation determines the variation in the rate of change and its own trends, capturing the acceleration or deceleration in data trends.

In some arrangements, an adjustment module is configured to adjust the extrapolated value for the current time based on the first-order and second-order differences. This adjustment ensures that the predicted value accurately reflects the current state of the infrastructure components.

In some arrangements, the system includes a data integration module configured to integrate the adjusted extrapolated value into the dataset, creating a continuous telemetry data stream. This integration maintains the integrity and continuity of the data for further analysis.

In some arrangements, a validation module is configured to validate the extrapolated telemetry data by comparing it with actual telemetry data once it becomes available. This validation assesses the accuracy of the extrapolation process and makes necessary adjustments to improve future predictions.

In some arrangements, the system features a machine learning model configured to be trained using the validated telemetry data. This training allows the model to learn underlying patterns and improve its predictive capabilities.

In some arrangements, a testing module is included to test the trained machine learning model to evaluate its performance using a separate validation dataset. This testing ensures that the model generalizes well to new, unseen data.

In some arrangements, an accuracy assessment module is configured to assess the accuracy of the machine learning model using metrics such as precision, recall, F1 score, or mean absolute error. This assessment determines the model's performance and reliability.

In some arrangements, a hyperparameter adjustment module is included to adjust hyperparameters of the machine learning model if the desired accuracy is not achieved. This adjustment optimizes the model's performance through iterative fine-tuning of parameters such as learning rate, number of layers, or number of trees in a random forest.

In some arrangements, the system features a data tuning module configured to tune the telemetry data to improve model performance. This tuning includes feature selection, feature scaling, and creating synthetic data to balance the dataset.

In some arrangements, a model finalization module is configured to finalize the machine learning model once the desired accuracy is achieved. This finalization fixes the model parameters and prepares it for deployment.

In some arrangements, the finalized machine learning model is configured to classify anomalies in the telemetry data, predicting whether a given data point represents a normal state or an anomaly. This classification enables timely detection and response to potential issues, ensuring the reliability and performance of the infrastructure components.

In some arrangements, a method for real-time anomaly prediction using near real-time data comprises the following steps. A sensor collects telemetry data from various infrastructure components. A logging system logs the collected telemetry data in real-time. A data extraction module extracts the logged telemetry data from the real-time log. A data analysis module analyzes the extracted telemetry data to identify patterns and anomalies. A data cleaning module cleans the telemetry data to remove noise and errors.

A feature engineering module performs feature engineering on the cleaned telemetry data. A calculation module calculates the weighted mean of previous telemetry data values, where the weights are the inverse of the distance from the current time. A computation module computes the first-order differences between previous telemetry data values and their weighted mean to determine the variation from the previous value and its own trends. The computation module also computes the second-order differences between previous telemetry data values and their weighted mean to determine the variation in the rate of change and its own trends. An adjustment module adjusts the extrapolated value for the current time based on the first-order and second-order differences.

A data integration module integrates the adjusted extrapolated value into the dataset to create a continuous telemetry data stream. A validation module validates the extrapolated telemetry data by comparing it with actual telemetry data once it becomes available. A machine learning model is trained using the validated telemetry data. A testing module tests the trained machine learning model to evaluate its performance. An accuracy assessment module assesses the accuracy of the machine learning model. A hyperparameter adjustment module adjusts hyperparameters of the machine learning model. A data tuning module tunes the telemetry data to improve model performance. A model finalization module finalizes the machine learning model. The finalized machine learning model classifies anomalies in the telemetry data.

In some arrangements, a method for predictive anomaly detection using machine learning models and telemetry data comprises several steps. First, telemetry data is collected by a plurality of sensors from various infrastructure components, including firewalls, switches, servers, and storage devices. This telemetry data includes metrics such as CPU utilization, memory usage, network traffic (incoming and outgoing), disk read speed, disk write speed, heat, number of processes, server load, network latency, response time per kilobyte of data, transactions per second, bandwidth usage, application response time, application throughput, disk read operations, disk write operations, disk input/output operations per second, network packets received per second, network packets transmitted per second, fan speed, power consumption, and disk space usage.

The collected telemetry data is logged in real-time by a logging system to create a continuous record. This logged data is then extracted by a data extraction module for further analysis and processing. The extracted telemetry data undergoes preprocessing by a data preprocessing module to handle missing values, normalize the data, and smooth outliers. Handling missing values involves assigning default values or using interpolation methods, normalizing the data involves scaling it to a common range, and smoothing outliers involves reducing the impact of extreme values using statistical methods.

Next, feature engineering is performed on the preprocessed telemetry data by a feature engineering module to create new features that enhance the performance of a machine learning model. This feature engineering includes calculating moving averages, trend lines, and interaction terms between different metrics. The machine learning model is then trained by a machine learning module using the engineered features from historical telemetry data to learn underlying patterns and detect anomalies. This training process involves splitting the historical telemetry data into training and validation sets and fitting the model to the training data.

The trained machine learning model is validated by the machine learning module using the validation set to assess its performance, which includes calculating metrics such as precision, recall, and F1 score. Once validated, the machine learning model is deployed by a deployment module for real-time anomaly detection on incoming telemetry data. The deployed model then predicts anomalies in real-time telemetry data, indicating whether a given data point represents a normal state or an anomaly based on the model's learned patterns.

These predictions are compared against predefined anomaly thresholds for each metric by a threshold comparison module, with the predefined thresholds representing maximum acceptable values for each metric. If any prediction indicates an anomaly, an alert generation module generates alert messages indicating the specific metric that has exceeded the threshold and the predicted value of the metric. These alert messages are then sent to system administrators via one or more communication channels, including email, SMS, and a monitoring dashboard, by an alert communication module.

The real-time telemetry data, predictions, and generated alerts are displayed to the system administrators by a monitoring interface, which provides a visual representation of the current state of the infrastructure components and highlights any metrics that have been predicted as anomalies. The machine learning model is continuously updated by a data update module with new telemetry data to improve its accuracy and adapt to changing patterns over time. This updating process involves retraining the model periodically with the most recent telemetry data.

Finally, the method continuously repeats these steps to ensure ongoing predictive anomaly detection and alerting, with the repeating performed at a predetermined interval to balance timely monitoring and system resource usage.

Regarding a second solution or embodiment for addressing the problems described above, in some arrangements, a system for real-time anomaly prediction using near real-time data comprises a plurality of sensors configured to collect telemetry data from various infrastructure components, including firewalls, switches, servers, and storage devices, capturing metrics such as CPU usage, memory consumption, network traffic, and error rates. A logging system is configured to log the collected telemetry data in real-time to create a continuous record of the telemetry data. A data extraction module is configured to extract the logged telemetry data from the real-time log for further analysis and processing. A data analysis module is configured to analyze the extracted telemetry data to identify patterns, trends, and any existing anomalies in the data.

A data cleaning module is configured to clean the telemetry data to remove noise, irrelevant information, and errors, including handling missing values, smoothing outliers, and normalizing data. A feature engineering module is configured to perform feature engineering on the cleaned telemetry data to create or modify features that enhance the performance of a machine learning model, including calculating moving averages, trend lines, or interaction terms between different metrics. A calculation module is configured to calculate the weighted mean of a plurality of previous telemetry data values, wherein the weights are the inverse of the distance from the current time, to provide a baseline value for extrapolation.

A computation module is configured to compute the first-order differences between consecutive previous telemetry data values and their weighted mean to determine the variation from the previous value and its own trends, wherein the weights are the inverse of the distance from the current time, capturing the immediate changes in the data. The computation module is further configured to compute the second-order differences between consecutive previous telemetry data values and their weighted mean to determine the variation in the rate of change and its own trends, wherein the weights are the inverse of the distance from the current time, capturing the acceleration or deceleration in data trends.

An adjustment module is configured to adjust the extrapolated value for the current time based on the first-order and second-order differences to fine-tune the predicted value, ensuring it accurately reflects the current state of the infrastructure components. A data integration module is configured to integrate the adjusted extrapolated value into the dataset to create a continuous telemetry data stream, maintaining the integrity and continuity of the data for further analysis. A validation module is configured to validate the extrapolated telemetry data by comparing it with actual telemetry data once it becomes available, assessing the accuracy of the extrapolation process and making necessary adjustments to improve future predictions.

A machine learning model is configured to be trained using the validated telemetry data to learn underlying patterns and improve its predictive capabilities. A testing module is configured to test the trained machine learning model to evaluate its performance using a separate validation dataset, ensuring the model generalizes well to new, unseen data. An accuracy assessment module is configured to assess the accuracy of the machine learning model using metrics such as precision, recall, F1 score, or mean absolute error to determine the model's performance and reliability. A hyperparameter adjustment module is configured to adjust hyperparameters of the machine learning model if the desired accuracy is not achieved, optimizing the model's performance through iterative fine-tuning of parameters such as learning rate, number of layers, or number of trees in a random forest. A data tuning module is configured to tune the telemetry data to improve model performance, including feature selection, feature scaling, and creating synthetic data to balance the dataset. A model finalization module is configured to finalize the machine learning model once the desired accuracy is achieved, fixing the model parameters and preparing it for deployment. The finalized machine learning model is further configured to classify anomalies in the telemetry data to predict whether a given data point represents a normal state or an anomaly, enabling timely detection and response to potential issues.

In some arrangements, the sensors are further configured to collect additional telemetry metrics such as disk usage, I/O operations, and latency from the infrastructure components. This expanded data collection allows for a more comprehensive analysis of the infrastructure's performance and potential issues.

In some arrangements, the data cleaning module is further configured to handle missing values using advanced imputation techniques such as k-nearest neighbors imputation, multiple imputation by chained equations (MICE), or deep learning-based imputation models. These sophisticated methods ensure that the cleaned data is of high quality and ready for further analysis and modeling.

In some arrangements, the feature engineering module is further configured to create composite features that capture interactions between multiple metrics, such as CPU-memory interaction terms or network-disk usage correlation features. By engineering these complex features, the model's ability to predict anomalies is significantly enhanced.

In some arrangements, the calculation module is further configured to compute the weighted mean using a dynamically adjustable window size based on the variability of the telemetry data. This approach ensures that the weighted mean adapts to changing data patterns, providing a more accurate baseline for extrapolation.

In some arrangements, the computation module is further configured to compute first-order differences using a robust differencing technique that minimizes the impact of outliers and noisy data points. This technique helps to determine the variation from the previous value and its own trends, capturing immediate changes in the data.

In some arrangements, the computation module is further configured to compute second-order differences using a smoothing algorithm to capture long-term trends and reduce the influence of short-term fluctuations. This step provides a more accurate understanding of the acceleration or deceleration in data trends.

In some arrangements, the adjustment module is further configured to incorporate higher-order differences if necessary, to capture more complex patterns and behaviors in the telemetry data. This approach ensures that the extrapolated value accurately reflects the current state of the infrastructure components.

In some arrangements, the validation module is further configured to use a feedback loop to continuously improve the weighting mechanisms and extrapolation parameters based on the validation results. This adaptive mechanism ensures the system evolves with changing data patterns, maintaining high accuracy in its predictions.

In some arrangements, a method for real-time anomaly prediction using near real-time data comprises the following steps. A sensor collects telemetry data from various infrastructure components. A logging system logs the collected telemetry data in real-time. A data extraction module extracts the logged telemetry data from the real-time log. A data analysis module analyzes the extracted telemetry data to identify patterns and anomalies. A data cleaning module cleans the telemetry data to remove noise and errors. A feature engineering module performs feature engineering on the cleaned telemetry data. A calculation module calculates the weighted mean of previous telemetry data values, where the weights are the inverse of the distance from the current time. A computation module computes the first-order differences between previous telemetry data values and their weighted mean to determine the variation from the previous value and its own trends.

The computation module also computes the second-order differences between previous telemetry data values and their weighted mean to determine the variation in the rate of change and its own trends. An adjustment module adjusts the extrapolated value for the current time based on the first-order and second-order differences. A data integration module integrates the adjusted extrapolated value into the dataset to create a continuous telemetry data stream. A validation module validates the extrapolated telemetry data by comparing it with actual telemetry data once it becomes available. A machine learning model is trained using the validated telemetry data. A testing module tests the trained machine learning model to evaluate its performance. An accuracy assessment module assesses the accuracy of the machine learning model. A hyperparameter adjustment module adjusts hyperparameters of the machine learning model. A data tuning module tunes the telemetry data to improve model performance. A model finalization module finalizes the machine learning model. The finalized machine learning model classifies anomalies in the telemetry data.

The various arrangements from the first and second technical solutions can be combined in whole or in part to achieve a particular desired solution, leveraging the strengths of both approaches to provide a comprehensive and robust system for real-time anomaly prediction using near real-time data. By integrating elements from both solutions, a more adaptable and precise system can be created that addresses the inherent challenges of delayed telemetry data collection and ensures accurate and timely incident prediction.

From the first technical solution, the steps of collecting telemetry data from various infrastructure components, logging this data in real-time, and extracting the logged telemetry data for further processing are fundamental and can be directly combined with the steps in the second technical solution. The comprehensive data collection and logging ensure a continuous and up-to-date stream of telemetry data, which is critical for both solutions. By combining these steps, the system can ensure that the telemetry data is always current, capturing the latest state of the infrastructure components.

The initial analysis and cleaning of the telemetry data to remove noise, irrelevant information, and errors are also crucial steps that are common to both solutions. By integrating the data cleaning and analysis steps from both solutions, the system can ensure high-quality data for further processing. This step can utilize advanced imputation techniques and robust differencing methods from the second solution to handle missing values and outliers effectively, ensuring the data used for prediction is accurate and reliable.

Feature engineering is another area where elements from both solutions can be combined. The first solution emphasizes creating or modifying features to improve the performance of machine learning models, including calculating moving averages and trend lines. The second solution adds the capability to create composite features that capture interactions between multiple metrics. By combining these approaches, the system can engineer a comprehensive set of features that enhance the predictive accuracy of the machine learning models.

The calculation of weighted means and the computation of first-order and second-order differences are key aspects of the second solution that can be integrated into the first solution. These calculations provide a robust method for extrapolating current telemetry data based on past values, capturing immediate changes and long-term trends in the data. By incorporating these techniques into the first solution, the system can ensure that the extrapolated telemetry data is accurate and reflective of the current state of the infrastructure components.

The integration and validation steps from both solutions can also be combined. The integration of adjusted extrapolated values into the dataset ensures a continuous telemetry data stream, maintaining data integrity for further analysis. The validation of extrapolated data by comparing it with actual telemetry data once it becomes available ensures the accuracy of the predictions. By using a feedback loop to continuously improve the weighting mechanisms and extrapolation parameters, the system can adapt to evolving data patterns, maintaining high accuracy in its predictions.

Training and testing the machine learning model using the validated telemetry data is another common step that can be enhanced by combining elements from both solutions. The advanced imputation techniques and robust differencing methods from the second solution can improve the quality of the training data, leading to better model performance. The hyperparameter adjustment and data tuning steps from the second solution can also be integrated to optimize the model's performance through iterative fine-tuning, ensuring the model generalizes well to new, unseen data.

Finally, the classification of anomalies and the generation of detailed reports and alerts can be combined from both solutions. By leveraging the strengths of both approaches, the system can provide timely and accurate anomaly detection, triggering automated incident response actions to prevent potential operational and reputational losses. This comprehensive system ensures continuous monitoring and protection of the infrastructure components, maintaining the reliability and performance of the entire network.

In summary, the various arrangements from the first and second technical solutions can be effectively combined to create a robust and adaptable system for real-time anomaly prediction using near real-time data. By integrating the strengths of both approaches, the system can address the challenges of delayed telemetry data collection, ensure high-quality data for analysis, and provide accurate and timely incident prediction, ultimately enhancing the operational resilience and reliability of the infrastructure components.

The following description and claims, in conjunction with the drawings—all integral parts of this specification—will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 11: Chart of Sample Telemetry Data—This provides a comprehensive overview of various telemetry attributes that can be monitored and analyzed within a system, useful for real-time anomaly prediction as disclosed in the inventions. It includes attributes such as CPU Utilization, Memory Usage, Network Traffic, Disk Read/Write Speed, Response Time, Bandwidth Usage, and many others, along with their metric descriptions and sample metric values. This detailed telemetry data can help in identifying performance bottlenecks, understanding system load, and predicting potential failures by analyzing metrics like percentage of CPU usage, amount of RAM used, data transmission rates, system load averages, and heat of hardware components.

DETAILED DESCRIPTION

Figure 1:
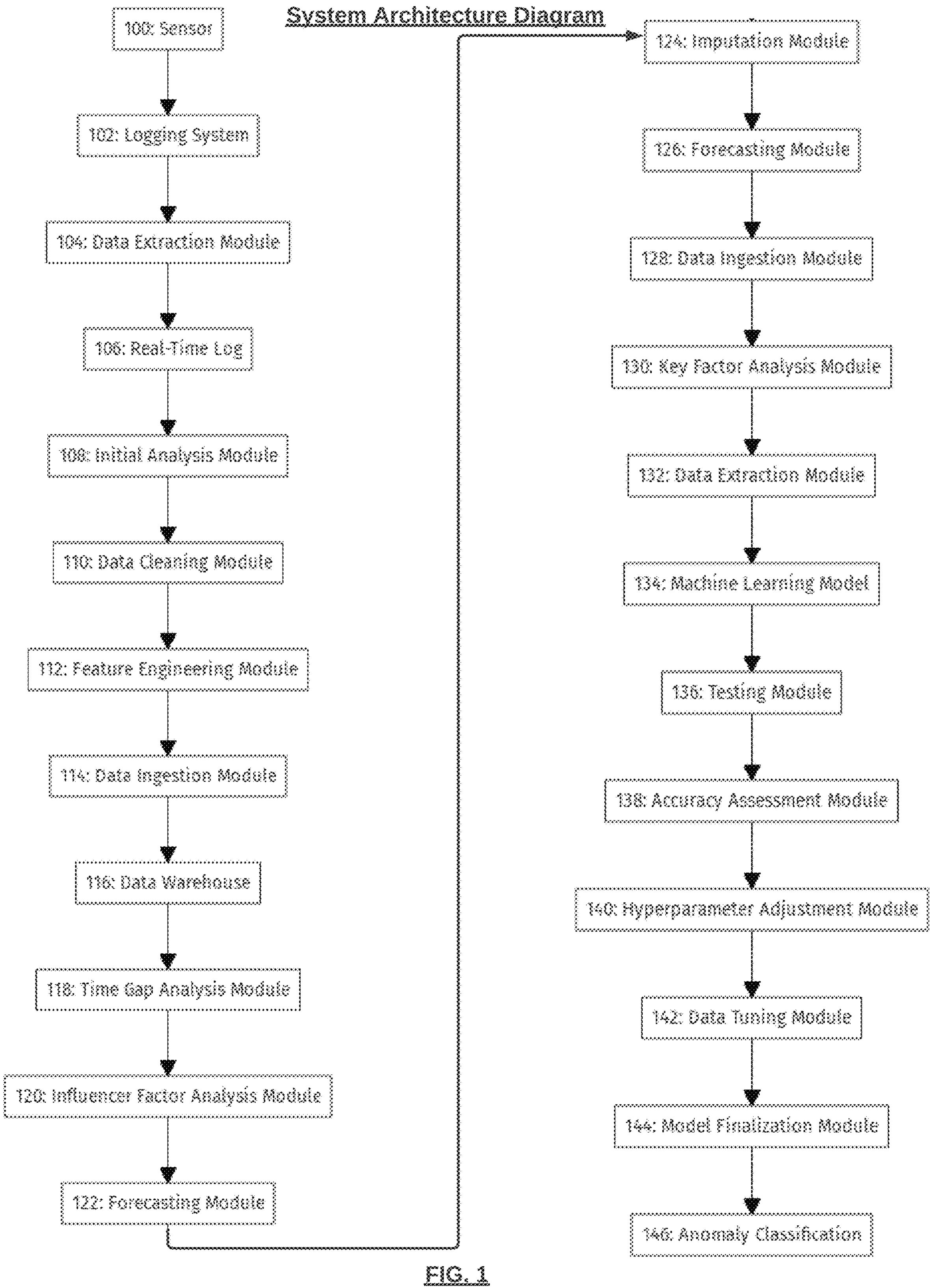
FIG. 1: System Architecture Diagram—This diagram illustrates the overall structure and organization of the system components involved in real-time anomaly prediction. It provides a high-level view of how different modules and components interact within the system.

By way of a brief overview of the inventions disclosed herein, the first technical solution addresses the challenge of real-time anomaly prediction using near real-time data by implementing a comprehensive method that captures, processes, and analyzes telemetry data from various infrastructure components. The system begins with the collection of telemetry data from firewalls, switches, servers, and storage devices, capturing metrics such as CPU usage, memory consumption, network traffic, and error rates. This data is logged in real-time, ensuring a continuous and accurate record of the telemetry data, which is critical for subsequent analysis.

Once the data is collected and logged, it is extracted from the real-time log for further processing. The extraction process is essential to isolate the relevant data sets needed for analysis and modeling. The extracted telemetry data undergoes an initial analysis to identify patterns, trends, and any existing anomalies. This step is crucial for understanding the data structure and detecting any early signs of issues that may impact the infrastructure's performance.

The next step involves cleaning the telemetry data to remove noise, irrelevant information, and errors. The data cleaning process includes handling missing values, smoothing outliers, and normalizing the data, ensuring that the data used for analysis is of high quality. This cleaned data is then subjected to feature engineering, where new features are created or existing ones are modified to enhance the performance of the machine learning model. This may include calculating moving averages, trend lines, or interaction terms between different metrics.

After feature engineering, the processed telemetry data is ingested into a data warehouse or similar storage solution. This repository allows for efficient storage and retrieval of large-scale data sets, which are essential for training and testing machine learning models. The system then analyzes gaps in the time series data to identify missing data points and evaluate their impact on the overall data analysis. This gap analysis helps ensure that the data set is complete and accurate.

The system performs influencer factor analysis on the telemetry data to identify factors that influence the behavior of the infrastructure components. These factors are forecasted based on historical and real-time data using statistical or machine learning models. The imputation module fills in the missing influencer factors in the dataset, making it complete and ready for further analysis. This imputed data is then used to forecast the missing time series telemetry data points, ensuring that the data stream remains continuous and accurate.

The forecasted telemetry data is ingested back into the system, maintaining the integrity and continuity of the data. Key factor analysis is performed to identify factors that significantly impact system performance. This analysis helps in selecting the most relevant features for training the machine learning model. The system then extracts the relevant telemetry data for model training and testing. The machine learning model is trained using this data, learning underlying patterns that help in accurate anomaly prediction.

The trained machine learning model is tested using a separate validation dataset to evaluate its performance. This testing ensures that the model generalizes well to new, unseen data. The accuracy of the model is assessed using metrics such as precision, recall, F1 score, or mean absolute error. If the desired accuracy is not achieved, the hyperparameters of the model are adjusted, and the data is tuned to improve performance. This iterative process continues until the model meets the desired accuracy requirements.

Once the model achieves the desired accuracy, it is finalized and prepared for deployment. The finalized machine learning model classifies anomalies in the telemetry data, predicting whether a given data point represents a normal state or an anomaly. This classification enables timely detection and response to potential issues, ensuring the reliability and performance of the infrastructure components. The system's comprehensive approach ensures high accuracy in anomaly prediction, enhancing the operational resilience of the network.

The second technical solution provides an alternative approach to real-time anomaly prediction using near real-time data by leveraging advanced data extrapolation techniques. The system begins with the collection of telemetry data from various infrastructure components, including firewalls, switches, servers, and storage devices. This data is logged in real-time, creating a continuous record that is essential for accurate analysis and prediction.

The collected telemetry data is extracted from the real-time log for further processing. This extraction isolates the relevant data sets needed for subsequent analysis. The extracted data undergoes an initial analysis to identify patterns, trends, and any existing anomalies. This step is crucial for understanding the data structure and detecting any early signs of issues that may affect the infrastructure's performance.

The telemetry data is then cleaned to remove noise, irrelevant information, and errors. This process includes handling missing values, smoothing outliers, and normalizing the data, ensuring that the data used for further analysis is of high quality. The cleaned data is subjected to feature engineering, where new features are created or existing ones are modified to enhance the performance of the machine learning model. This may include calculating moving averages, trend lines, or interaction terms between different metrics.

A key aspect of this solution is the calculation of the weighted mean of previous telemetry data values, where the weights are the inverse of the distance from the current time. This calculation provides a baseline value for extrapolation. The system computes first-order differences between consecutive previous telemetry data values and their weighted mean to determine the variation from the previous value and its own trends. This computation captures the immediate changes in the data.

Additionally, the system computes second-order differences between consecutive previous telemetry data values and their weighted mean to determine the variation in the rate of change and its own trends. This step captures the acceleration or deceleration in data trends, providing a more accurate understanding of the data's dynamics. The adjustment module then adjusts the extrapolated value for the current time based on the first-order and second-order differences, ensuring that the predicted value accurately reflects the current state of the infrastructure components.

The adjusted extrapolated value is integrated into the dataset, creating a continuous telemetry data stream. This integration maintains the integrity and continuity of the data for further analysis. The extrapolated telemetry data is validated by comparing it with actual telemetry data once it becomes available. This validation assesses the accuracy of the extrapolation process and makes necessary adjustments to improve future predictions.

The validated telemetry data is used to train a machine learning model. The model learns underlying patterns that help in accurate anomaly prediction. The trained model is tested using a separate validation dataset to evaluate its performance. This testing ensures that the model generalizes well to new, unseen data. The accuracy of the model is assessed using metrics such as precision, recall, F1 score, or mean absolute error. If the desired accuracy is not achieved, the hyperparameters of the model are adjusted, and the data is tuned to improve performance.

Once the model achieves the desired accuracy, it is finalized and prepared for deployment. The finalized machine learning model classifies anomalies in the telemetry data, predicting whether a given data point represents a normal state or an anomaly. This classification enables timely detection and response to potential issues, ensuring the reliability and performance of the infrastructure components. By leveraging advanced extrapolation techniques, this solution provides a robust and accurate method for real-time anomaly prediction, enhancing the operational resilience of the network.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

Terms such as "computers," "machines," and similar phrases are used interchangeably based on the context to denote devices that may be general-purpose or specialized for specific functions, whether virtual or physical, and capable of network connectivity. This encompasses all pertinent hardware, software, and components known to those skilled in the field. Such devices might feature specialized circuits like application-specific integrated circuits (ASICs), microprocessors, cores, or other processing units for executing, accessing, controlling, or implementing various types of software, instructions, data, modules, processes, or routines. The employment of these terms within this document is not intended to restrict or exclusively refer to any specific type of electronic devices or components, and should be interpreted broadly by those with relevant expertise. For conciseness and assuming familiarity, detailed descriptions of computer/software components and machines are omitted.

Software, executable code, data, modules, procedures, and similar entities may reside on tangible, physical computer-readable storage devices. This includes a range from local memory to network-attached storage, and various other accessible memory types, whether removable, remote, cloud-based, or accessible through other means. These elements can be stored in both volatile and non-volatile memory forms and may operate under different conditions such as autonomously, on-demand, as per a preset schedule, spontaneously, proactively, or in response to certain triggers. They may be consolidated or distributed across multiple computers or devices, integrating their memory and other components. These elements can also be located or dispersed across network-accessible storage systems, within distributed databases, big data infrastructures, blockchains, or distributed ledger technologies, whether collectively or in distributed configurations.

The term "networks" and similar references encompass a wide array of communication systems, including local area networks (LANs), wide area networks (WANs), the Internet, cloud-based networks, and both wired and wireless configurations. This category also covers specialized networks such as digital subscriber line (DSL) networks, frame relay networks, asynchronous transfer mode (ATM) networks, and virtual private networks (VPN), which may be interconnected in various configurations. Networks are equipped with specific interfaces to facilitate diverse types of communications—internal, external, and administrative—and have the ability to assign virtual IP addresses (VIPs) as needed. Network architecture involves a suite of hardware and software components, including but not limited to access points, network adapters, buses, both wired and wireless ethernet adapters, firewalls, hubs, modems, routers, and switches, which may be situated within the network, on its edge, or externally. Software and executable instructions operate on these components to facilitate network functions. Moreover, networks support HTTPS and numerous other communication protocols, enabling them to handle packet-based data transmission and communications effectively.

As used herein, Generative Artificial Intelligence (AI) or the like refers to AI techniques that learn from a representation of training data and use it to generate new content similar to or inspired by existing data. Generated content may include human-like outputs such as natural language text, source code, images/videos, and audio samples. Generative AI solutions typically leverage open-source or vendor sourced (proprietary) models, and can be provisioned in many ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise AI Policy and an Enterprise Model Risk Policy.

Generative artificial intelligence models have been evolving rapidly, with various organizations developing their own versions. Sample generative AI models that can be used under various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models-Meta LLAMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in biology and medicine. (5) NVIDIA AI Models-Megatron: A large, powerful transformer model designed for natural language processing tasks. (6) IBM AI Models-Watson: Known for its application in various fields for processing and analyzing large amounts of natural language data. (7) XLNet: An extension of the Transformer model, outperforming BERT in several benchmarks. (8) GROVER: Designed for detecting and generating news articles, useful in understanding media-related content. These models represent a range of applications and capabilities in generative AI. One or more of the foregoing may be used herein as desired. All are considered within the sphere and scope of this disclosure.

Generative AI and LLMs can be used in various parts of this disclosure performing one or more various tasks, as desired, including: (1) Natural Language Processing (NLP): This involves understanding, interpreting, and generating human language. (2) Data Analysis and Insight Generation: Including trend analysis, pattern recognition, and generating predictions and forecasts based on historical data. (3) Information Retrieval and Storage: Efficiently managing and accessing large data sets. (4) Software Development Lifecycle: Encompassing programming, application development, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Processing, searching, retrieving, and using large quantities of information effectively. (9) Data Classification: Categorizing and classifying data for better organization and analysis. (10) Feedback Learning: Processes whereby AI/LLMs improve performance based on feedback it receives. (Key aspects can include, for example, human feedback, Reinforcement Learning, interactive learning, iterative improvement, adaptation, etc.). (11) Context Determination: Identifying the relevant context in various scenarios. (12) Writing Assistance: Offering help in composing human-like text for various forms of writing. (13) Language Analysis: Analyzing language structures and semantics. (14) Comprehensive Search Capabilities: Performing detailed and extensive searches across vast data sets. (15) Question Answering: Providing accurate answers to user queries. (16) Sentiment Analysis: Analyzing and interpreting emotions or opinions from text. (17) Decision-Making Support: Providing insights that aid in making informed decisions. (18) Information Summarization: Condensing information into concise summaries. (19) Creative Content Generation: Producing original and imaginative content. (20) Language Translation: Converting text or speech from one language to another.

FIG. 1, by way of non-limiting disclosure, depicts a sample system architecture for the first invention that begins with the Sensor (100), which is responsible for collecting telemetry data from various infrastructure components such as firewalls, switches, servers, and storage devices. These sensors meticulously gather critical metrics that are essential for monitoring the health and performance of these components. Metrics such as CPU usage, memory consumption, network traffic, error rates, disk usage, I/O operations, and latency are captured to provide a comprehensive view of the infrastructure's operational state, enabling early detection of potential issues.

Following the data collection, the telemetry data is passed to the Logging System (102), which logs the collected data in real-time. This logging process is crucial as it ensures that every data point is recorded precisely at the moment it occurs, maintaining a continuous and accurate record of the telemetry data. The real-time logging capability is fundamental to the system's effectiveness, as it provides a reliable data stream that reflects the current state of the infrastructure. This immediate logging allows the system to process and analyze data without delays, which is essential for real-time anomaly detection.

The Data Extraction Module (104) then takes over, extracting the logged telemetry data from the real-time log for further processing. This module is designed to efficiently isolate the relevant data sets required for subsequent analysis steps. By quickly and accurately retrieving large volumes of data, the extraction module ensures that the system can continuously monitor and analyze the infrastructure's performance. This efficiency is critical for maintaining the timeliness and relevance of the data being analyzed.

Once the data is extracted, the Data Analysis Module (106) performs an initial analysis to identify patterns, trends, and any existing anomalies within the data. This module plays a crucial role in understanding the structure of the data and detecting early signs of issues that could impact the infrastructure's performance. By recognizing these patterns and anomalies, the system can take proactive measures to prevent potential problems, ensuring the smooth operation of the infrastructure.

Following the initial analysis, the Data Cleaning Module (108) processes the telemetry data to remove noise, irrelevant information, and errors. This module employs advanced techniques to handle missing values, such as k-nearest neighbors imputation, multiple imputation by chained equations (MICE), or deep learning-based models. Additionally, it smooths outliers and normalizes the data to ensure high-quality data for further processing. Cleaning the data is a critical step as it enhances the accuracy and reliability of the analysis and the subsequent steps, ensuring that the insights derived from the data are based on accurate and relevant information.

The cleaned data then undergoes feature engineering by the Feature Engineering Module (110). This module is tasked with creating new features or modifying existing ones to enhance the performance of the machine learning models. It calculates moving averages, trend lines, and interaction terms between different metrics to provide a richer set of features for the models to learn from. By engineering composite features that capture interactions between multiple metrics, this module significantly improves the model's ability to accurately predict anomalies.

Next, the processed data is ingested into the system by the Data Ingestion Module (112). This involves loading the data into a data warehouse or a similar storage solution, where it can be easily accessed for further analysis and model training. The main repository is often a high-performance database or data lake that supports large-scale data storage and retrieval. This step ensures that the data is organized and readily available for the subsequent analytical processes.

The Time Gap Analysis Module (114) then analyzes the time series telemetry data to identify and evaluate the impact of any missing data points. This module checks for periods where no data was collected and determines how these gaps might affect the overall analysis. By understanding the extent and implications of these time gaps, the system can adjust its analysis to account for incomplete data, ensuring that the predictions remain accurate.

Following the time gap analysis, the Influencer Factor Analysis Module (116) examines the factors that influence the behavior of the infrastructure components. These influencer factors might include external conditions, configuration changes, or interdependencies between components. By identifying these factors, the module provides a deeper understanding of the variables that impact the performance and reliability of the infrastructure.

The Forecasting Module (118) utilizes statistical or machine learning models to predict the future values of the identified influencer factors based on historical and real-time telemetry data. This module generates forecasts that help in anticipating the future state of the infrastructure components. Accurate forecasting of these factors is crucial for proactive maintenance and incident prevention.

To address any gaps identified during the time gap analysis, the Imputation Module (120) fills in the missing influencer factors in the dataset using imputation techniques such as mean substitution, regression imputation, or more sophisticated predictive models. This step ensures that the dataset is complete and ready for further analysis, maintaining the integrity of the data stream.

The Key Factor Analysis Module (122) performs further analysis to identify the factors that significantly impact the system's performance. This module determines which factors are most predictive of anomalies or outages, providing insights that enhance the accuracy and reliability of the machine learning models.

The system then trains a Machine Learning Model (124) using the relevant telemetry data extracted and processed in the previous steps. The model learns the underlying patterns in the data, improving its predictive capabilities. Training involves feeding the data into the model and adjusting the model parameters to optimize the learning process, building a robust model capable of accurate anomaly prediction.

The trained model undergoes rigorous testing by the Testing Module (126) to evaluate its performance. This testing uses a separate validation dataset to assess how well the model generalizes to new, unseen data, ensuring its effectiveness in real-world scenarios. By validating the model's performance, the system ensures that its predictions are reliable and accurate.

The Accuracy Assessment Module (128) assesses the accuracy of the machine learning model using various performance metrics such as precision, recall, F1 score, or mean absolute error. This comprehensive evaluation identifies areas where the model may need improvement and ensures that it meets the desired accuracy standards.

If the desired accuracy is not achieved, the Hyperparameter Adjustment Module (130) iteratively adjusts the hyperparameters of the machine learning model. This process involves fine-tuning parameters such as learning rate, number of layers, or number of trees in a random forest to optimize the model's performance. By carefully adjusting these parameters, the module enhances the model's predictive accuracy and overall performance.

The Data Tuning Module (132) further improves model performance by tuning the telemetry data. This module performs feature selection to choose the most relevant features, feature scaling to adjust the range of data values, and creates synthetic data to balance the dataset. These tuning efforts ensure that the machine learning model is trained on high-quality, well-prepared data, enhancing its ability to make accurate and reliable predictions.

Once the desired accuracy is achieved, the Model Finalization Module (134) finalizes the machine learning model. This involves fixing the model parameters and preparing it for deployment, ensuring that the model is stable and ready for use in a production environment. Finalizing the model is a critical step in transitioning from development to operational use, providing a reliable tool for real-time anomaly detection.

The finalized machine learning model then performs Anomaly Classification (136), where it classifies anomalies in the telemetry data. The model predicts whether a given data point represents a normal state or an anomaly. When an anomaly is detected, the system triggers appropriate automated incident response actions, such as generating detailed reports and alerts. These responses help prevent potential operational and reputational losses, ensuring continuous monitoring and protection of the infrastructure components. By leveraging advanced data analysis, machine learning, and real-time processing, the system enhances the operational resilience and reliability of the infrastructure, enabling proactive maintenance and swift incident response.

Figure 2:
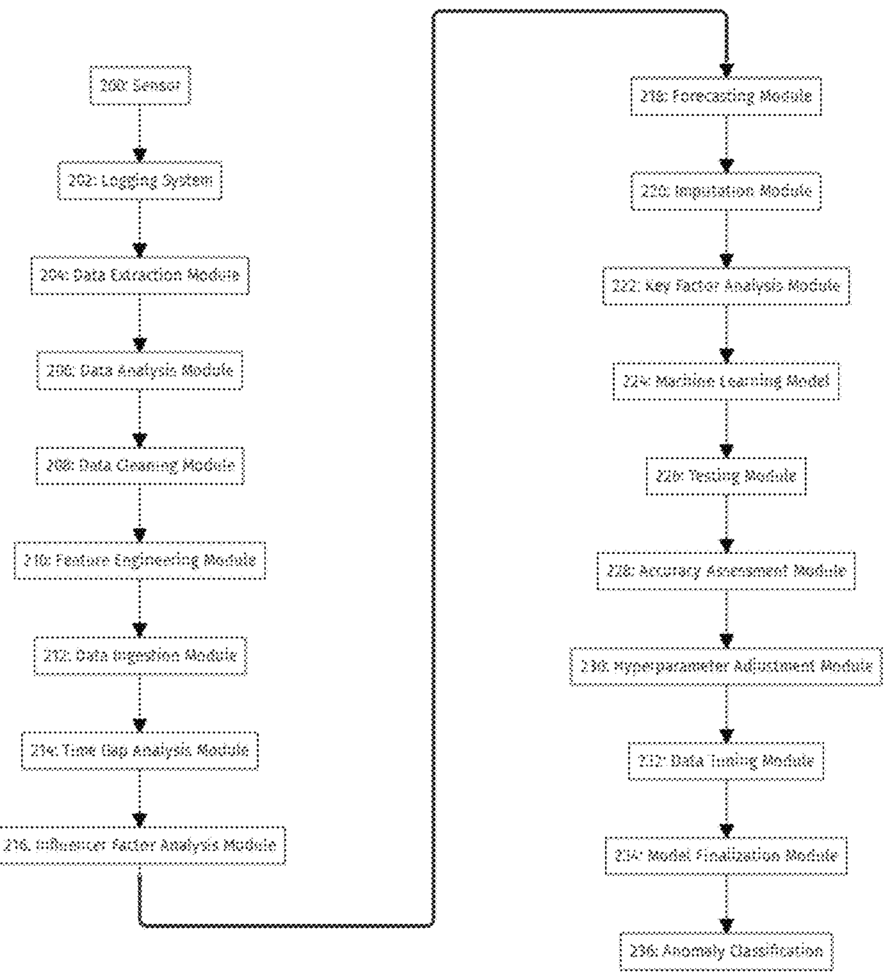
FIG. 2: Data Flow Diagram—This diagram depicts the flow of data through the system, showing how telemetry data is collected, processed, and analyzed. It details the steps involved in data acquisition, logging, extraction, and further processing.

FIG. 2, by way of non-limiting disclosure, depicts a sample data flow diagram that begins with the Sensor (200), which serves as the first critical component in the system architecture. The sensor is responsible for collecting telemetry data from a variety of infrastructure elements such as firewalls, switches, servers, and storage devices. Telemetry data, which involves the automated collection and transmission of data from remote or inaccessible points to receiving equipment for monitoring, is essential for providing a comprehensive view of the infrastructure's operational state. The sensor captures vital metrics, including CPU usage, memory consumption, network traffic, error rates, disk usage, I/O operations, and latency. Each of these metrics provides insight into the performance and health of the infrastructure components. For instance, CPU usage helps in understanding the processing load, while network traffic metrics indicate the data flow through network devices. Error rates can signal potential issues, such as hardware malfunctions or software bugs, that need immediate attention.

Once the telemetry data is collected by the sensor, it flows into the Logging System (202). The logging system's primary function is to record the collected telemetry data in real-time. Real-time logging ensures that every data point is captured precisely at the moment it occurs, maintaining a continuous and accurate record of the telemetry data. This process is fundamental to the system's effectiveness, as it provides a reliable data stream that reflects the current state of the infrastructure. The immediate logging allows the system to process and analyze data without delays, which is crucial for real-time anomaly detection. The logging system typically utilizes high-throughput storage solutions to handle the volume and velocity of incoming data, ensuring that no data is lost or delayed.

Following the logging of data, the Data Extraction Module (204) retrieves the logged telemetry data from the real-time log for further processing. This module is designed to efficiently isolate the relevant data sets required for subsequent analysis steps. By quickly and accurately extracting large volumes of data, the extraction module ensures that the system can continuously monitor and analyze the infrastructure's performance. This efficiency is critical for maintaining the timeliness and relevance of the data being analyzed. The data extraction process involves parsing the logged data, filtering out unnecessary information, and selecting the data points relevant to the analysis, which can be quite complex given the potentially massive size and diverse nature of the data sets.

The extracted data then moves to the Data Analysis Module (206), which performs an initial analysis to identify patterns, trends, and any existing anomalies within the data. This module plays a crucial role in understanding the structure of the data and detecting early signs of issues that could impact the infrastructure's performance. By recognizing these patterns and anomalies, the system can take proactive measures to prevent potential problems, ensuring the smooth operation of the infrastructure. The analysis process involves statistical techniques and machine learning algorithms to detect outliers, correlations, and trends within the data. For example, a sudden spike in error rates or a gradual increase in CPU usage could be indicative of an underlying issue that needs to be addressed.

Once the initial analysis is complete, the data flows into the Data Cleaning Module (208). This module is responsible for cleaning the telemetry data by removing noise, irrelevant information, and errors. Noise in data refers to random or meaningless information that can obscure or distort the true signal. This module employs advanced techniques to handle missing values, such as k-nearest neighbors imputation, multiple imputation by chained equations (MICE), or deep learning-based models. Additionally, the module smooths outliers and normalizes the data, ensuring high-quality data for further processing. Cleaning the data is a critical step as it enhances the accuracy and reliability of the analysis and subsequent steps, ensuring that the insights derived from the data are based on accurate and relevant information. Data cleaning may also involve de-duplication, where repeated data points are identified and removed to prevent skewing the analysis results.

The cleaned data then undergoes feature engineering by the Feature Engineering Module (210). This module is tasked with creating new features or modifying existing ones to enhance the performance of the machine learning models. Feature engineering involves transforming raw data into informative inputs that can improve the model's predictive power. This module calculates moving averages, trend lines, and interaction terms between different metrics to provide a richer set of features for the models to learn from. For example, a moving average of CPU usage can smooth out short-term fluctuations, making long-term trends more apparent. Interaction terms might capture relationships between different metrics, such as how memory usage affects network traffic. By engineering composite features that capture interactions between multiple metrics, this module significantly improves the model's ability to accurately predict anomalies.

Next, the processed data is ingested into the system by the Data Ingestion Module (212). This involves loading the data into a data warehouse or a similar storage solution, where it can be easily accessed for further analysis and model training. A data warehouse is a centralized repository designed to store large volumes of structured and semi-structured data. The main repository is often a high-performance database or data lake that supports large-scale data storage and retrieval. Data lakes, in particular, are capable of storing raw data in its native format, including structured, semi-structured, and unstructured data. This step ensures that the data is organized and readily available for the subsequent analytical processes. The ingestion process may involve data transformation and enrichment to align the data with the schema of the target storage system.

The Time Gap Analysis Module (214) then analyzes the time series telemetry data to identify and evaluate the impact of any missing data points. Time series data refers to data points indexed in time order, often with equal intervals between them. This module checks for periods where no data was collected and determines how these gaps might affect the overall analysis. For instance, if data is missing for a critical period, it could lead to incorrect conclusions about the system's performance. By understanding the extent and implications of these time gaps, the system can adjust its analysis to account for incomplete data, ensuring that the predictions remain accurate. Techniques such as interpolation or the use of surrogate data sources can help fill in these gaps, ensuring the continuity and completeness of the data stream.

Following the time gap analysis, the Influencer Factor Analysis Module (216) examines the factors that influence the behavior of the infrastructure components. Influencer factors are variables that have a significant impact on the performance and reliability of the system. These might include external conditions such as heat or humidity, configuration changes like software updates or hardware upgrades, or interdependencies between components, such as how network load affects server performance. By identifying these factors, the module provides a deeper understanding of the variables that impact the performance and reliability of the infrastructure. This analysis can help pinpoint the root causes of anomalies and guide interventions to mitigate their effects.

The Forecasting Module (218) utilizes statistical or machine learning models to predict the future values of the identified influencer factors based on historical and real-time telemetry data. Forecasting involves estimating future values based on past and present data, often using models such as ARIMA (AutoRegressive Integrated Moving Average), exponential smoothing, or more advanced machine learning techniques like recurrent neural networks (RNNs). This module generates forecasts that help in anticipating the future state of the infrastructure components. For example, it might predict an impending spike in network traffic based on historical patterns. Accurate forecasting of these factors is crucial for proactive maintenance and incident prevention, allowing the system to take preemptive actions to avoid potential issues.

To address any gaps identified during the time gap analysis, the Imputation Module (220) fills in the missing influencer factors in the dataset using imputation techniques such as mean substitution, regression imputation, or more sophisticated predictive models. Imputation refers to the process of replacing missing data with substituted values. This step ensures that the dataset is complete and ready for further analysis, maintaining the integrity of the data stream. Imputation techniques help preserve the dataset's overall structure and statistical properties, ensuring that the analysis remains robust and reliable.

The Key Factor Analysis Module (222) performs further analysis to identify the factors that significantly impact the system's performance. Key factors are those variables that have the most influence on the system's behavior and are most predictive of anomalies or outages. This module determines which factors are most critical to monitor and manage, providing insights that enhance the accuracy and reliability of the machine learning models. By focusing on these key factors, the system can prioritize its resources and efforts to maintain optimal performance.

The system then trains a Machine Learning Model (224) using the relevant telemetry data extracted and processed in the previous steps. Machine learning involves the use of algorithms that allow computers to learn from data and make predictions or decisions without being explicitly programmed. The model learns the underlying patterns in the data, improving its predictive capabilities. Training involves feeding the data into the model and adjusting the model parameters to optimize the learning process. This process is iterative, often involving techniques such as cross-validation and hyperparameter tuning to achieve the best performance. A well-trained model can accurately predict anomalies, providing reliable insights into the infrastructure's performance.

The trained model undergoes rigorous testing by the Testing Module (226) to evaluate its performance. This testing uses a separate validation dataset to assess how well the model generalizes to new, unseen data, ensuring its effectiveness in real-world scenarios. Validation helps ensure that the model's predictions are not just accurate for the training data but also for new data it has not encountered before. By validating the model's performance, the system ensures that its predictions are both reliable and accurate.

The Accuracy Assessment Module (228) assesses the accuracy of the machine learning model using various performance metrics such as precision, recall, F1 score, or mean absolute error. Precision measures the proportion of true positive predictions among all positive predictions, while recall measures the proportion of true positive predictions among all actual positives. The F1 score is the harmonic mean of precision and recall, providing a single measure that balances both. Mean absolute error measures the average magnitude of errors in the predictions, providing insight into the model's accuracy. This comprehensive evaluation identifies areas where the model may need improvement and ensures that it meets.

Figure 3:
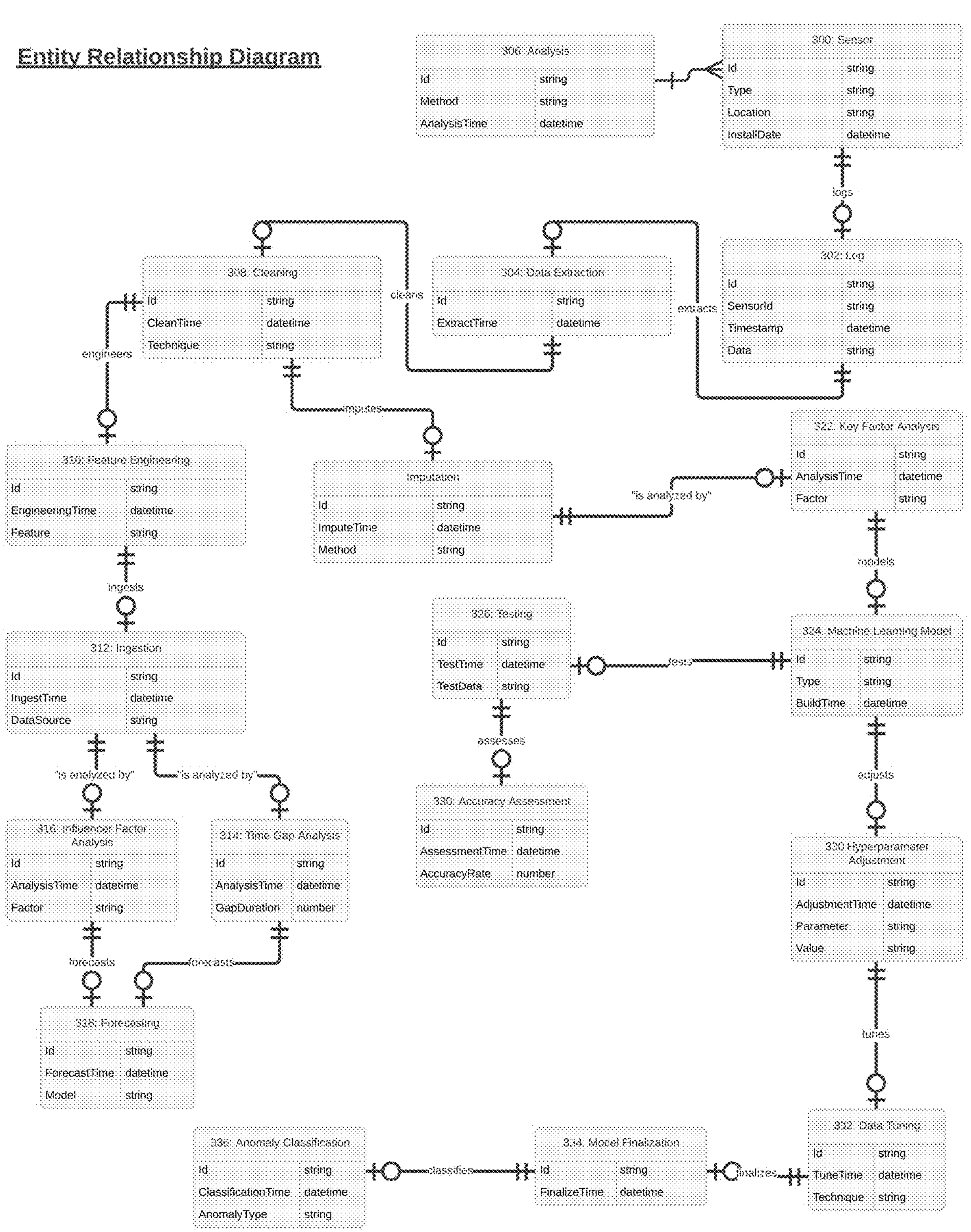
FIG. 3: Entity Relationship Diagram—This diagram shows the relationships between various entities in the system, such as sensors, logs, and different processing modules. It includes attributes for each entity, providing insight into their roles and interactions.

FIG. 3, by way of non-limiting disclosure, depicts an entity relationship diagram for the first aspect of the invention. The Sensor (300) entity is the initial point of data collection in the system. It is responsible for collecting telemetry data from various infrastructure components, including firewalls, switches, servers, and storage devices. Telemetry data is automated data collected from remote sources and transmitted to a central system for monitoring and analysis. The metrics captured by the sensor include CPU usage, which indicates the amount of processing power being used; memory consumption, which shows how much memory is being utilized; network traffic, which measures the data flow across the network; error rates, which highlight the frequency of errors occurring within the system; disk usage, which indicates how much storage space is being used; I/O operations, which show the read/write activities on the storage devices; and latency, which measures the delay in data transmission. This comprehensive data collection provides a detailed view of the operational state of the infrastructure, enabling early detection of potential issues.

The Log (302) entity stores the telemetry data collected by the sensors. This logging system records data in real-time, ensuring that every data point is captured as it occurs. Real-time logging is crucial for maintaining a continuous and accurate record of the telemetry data, which is essential for real-time anomaly detection. The log system typically utilizes high-throughput storage solutions to handle the large volume and velocity of incoming data, ensuring that no data is lost or delayed. This continuous logging provides a reliable data stream that reflects the current state of the infrastructure, forming the basis for subsequent data processing and analysis.

The Data Extraction (304) entity retrieves the logged telemetry data from the log for further processing. This entity is designed to efficiently isolate and extract relevant data sets required for analysis. The data extraction process involves parsing the logged data, filtering out unnecessary information, and selecting data points relevant to the analysis. This ensures that the system can continuously monitor and analyze the infrastructure's performance with timely and relevant data. By quickly and accurately extracting large volumes of data, the data extraction module ensures the efficiency and effectiveness of the system's monitoring and analytical processes.

The Analysis (306) entity performs an initial examination of the extracted data to identify patterns, trends, and any existing anomalies. This entity uses statistical techniques and machine learning algorithms to detect outliers, correlations, and trends within the data. For example, it might use regression analysis to identify relationships between different metrics or clustering algorithms to group similar data points. Recognizing these patterns and anomalies allows the system to take proactive measures to prevent potential problems, ensuring the smooth operation of the infrastructure. The analysis process helps in understanding the data structure and provides insights that guide further data processing and decision-making.

The Cleaning (308) entity is responsible for preparing the data for analysis by removing noise, irrelevant information, and errors. Noise refers to random or meaningless information that can obscure or distort the true signal. Data cleaning involves handling missing values using techniques like k-nearest neighbors imputation, multiple imputation by chained equations (MICE), or deep learning-based models. It also involves smoothing outliers and normalizing the data to ensure high-quality, accurate, and reliable data for further processing. Cleaning the data enhances the validity of the analysis and subsequent steps, ensuring that the insights derived from the data are based on accurate and relevant information. This step may also include de-duplication, where repeated data points are identified and removed to prevent skewing the analysis results.

The Feature Engineering (310) entity transforms the cleaned data into informative features that can enhance the performance of the machine learning models. This involves creating new features or modifying existing ones. Feature engineering calculates moving averages to smooth out short-term fluctuations and identify long-term trends, trend lines to understand data trajectories, and interaction terms between different metrics to capture relationships between variables. For instance, it might combine CPU usage and memory consumption to create a composite feature that provides more insight than the individual metrics alone. By engineering features that capture interactions between multiple metrics, this entity improves the model's ability to accurately predict anomalies.

The Ingestion (312) entity loads the processed data into a data warehouse or similar storage solution for easy access and further analysis. A data warehouse is a centralized repository designed to store large volumes of structured and semi-structured data. The data ingestion process involves transforming and organizing the data to align with the schema of the target storage system. This ensures that the data is ready for analysis and model training. The ingestion process may involve data transformation and enrichment to enhance the quality and usability of the data. This step ensures that the data is organized, complete, and readily available for the next stages of analysis.

The Time Gap Analysis (314) entity examines the time series telemetry data to identify and evaluate the impact of missing data points. Time series data refers to data points indexed in time order, often with equal intervals between them. This entity checks for periods where no data was collected and determines how these gaps might affect the overall analysis. For example, it might identify gaps caused by network outages or system failures. Understanding the extent and implications of these time gaps allows the system to adjust its analysis to account for incomplete data, ensuring that the predictions remain accurate. Techniques such as interpolation or using surrogate data sources can help fill in these gaps, ensuring the continuity and completeness of the data stream.

The Influencer Factor Analysis (316) entity examines the factors that influence the behavior of the infrastructure components. Influencer factors are variables that have a significant impact on the performance and reliability of the system. This entity identifies external conditions, configuration changes, or interdependencies between components that may affect performance. For example, it might analyze how heat changes affect server performance or how network load impacts data throughput. By identifying and analyzing these factors, the entity provides a deeper understanding of the variables impacting the infrastructure. This analysis helps pinpoint the root causes of anomalies and guides interventions to mitigate their effects.

The Forecasting (318) entity uses statistical or machine learning models to predict the future values of identified influencer factors based on historical and real-time telemetry data. Forecasting involves estimating future values based on past and present data. This entity generates forecasts to anticipate the future state of the infrastructure components, enabling proactive maintenance and incident prevention. For example, it might predict an impending spike in network traffic based on historical patterns. Accurate forecasting of these factors is crucial for planning and managing resources effectively, allowing the system to take preemptive actions to avoid potential issues.

The Imputation (320) entity addresses any gaps identified during the time gap analysis by filling in the missing influencer factors in the dataset. Imputation refers to the process of replacing missing data with substituted values using techniques such as mean substitution, regression imputation, or more sophisticated predictive models. This step ensures that the dataset is complete and ready for further analysis, maintaining the integrity of the data stream. Imputation techniques help preserve the overall structure and statistical properties of the dataset, ensuring that the analysis remains robust and reliable despite the presence of missing data.

The Key Factor Analysis (322) entity performs further analysis to identify the factors that significantly impact the system's performance. Key factors are those variables that have the most influence on the system's behavior and are most predictive of anomalies or outages. This entity determines which factors are critical to monitor and manage, enhancing the accuracy and reliability of the machine learning models. By focusing on these key factors, the system can prioritize its resources and efforts to maintain optimal performance. For example, it might identify that network latency is a critical factor affecting overall system performance, guiding efforts to monitor and reduce latency.

The Machine Learning Model (324) entity involves training the model using the relevant telemetry data extracted and processed in the previous steps. Machine learning involves the use of algorithms that allow computers to learn from data and make predictions or decisions without being explicitly programmed. The model learns the underlying patterns in the data, improving its predictive capabilities. Training involves feeding the data into the model and adjusting the model parameters to optimize the learning process. This process is iterative, often involving techniques such as cross-validation and hyperparameter tuning to achieve the best performance. A well-trained model can accurately predict anomalies, providing reliable insights into the infrastructure's performance.

The Testing (326) entity rigorously evaluates the performance of the trained machine learning model. This testing uses a separate validation dataset to assess how well the model generalizes to new, unseen data. Validation helps ensure that the model's predictions are not just accurate for the training data but also for new data it has not encountered before. By validating the model's performance, the system ensures that its predictions are both reliable and accurate. The testing process involves calculating performance metrics such as accuracy, precision, recall, F1 score, and mean absolute error to evaluate the model's effectiveness.

The Accuracy Assessment (328) entity assesses the accuracy of the machine learning model using various performance metrics. Precision measures the proportion of true positive predictions among all positive predictions, while recall measures the proportion of true positive predictions among all actual positives. The F1 score is the harmonic mean of precision and recall, providing a single measure that balances both. Mean absolute error measures the average magnitude of errors in the predictions. This comprehensive evaluation identifies areas where the model may need improvement and ensures that it meets the desired accuracy standards. The accuracy assessment helps in fine-tuning the model to enhance its predictive performance.

The Data Tuning (332) entity further enhances model performance by optimizing the telemetry data. This entity performs feature selection to choose the most relevant features, feature scaling to adjust the range of data values, and creates synthetic data to balance the dataset. Data tuning ensures that the machine learning model is trained on high-quality, well-prepared data, enhancing its predictive accuracy. For instance, feature scaling ensures that all input features are on a similar scale, preventing certain features from dominating the model's learning process due to their larger numeric range.

The Model Finalization (334) entity finalizes the machine learning model once it achieves the desired accuracy. This involves fixing the model parameters and preparing it for deployment. Model finalization ensures that the model is stable, reliable, and ready for use in a production environment. This step includes documenting the model's configuration, performance metrics, and deployment requirements to ensure smooth integration into the operational workflow.

The Anomaly Classification (336) entity classifies anomalies in the telemetry data using the finalized machine learning model. Anomaly classification involves predicting whether a given data point represents a normal state or an anomaly. When an anomaly is detected, the system triggers appropriate automated incident response actions, such as generating detailed reports and alerts. These responses help prevent potential operational and reputational losses, ensuring continuous monitoring and protection of the infrastructure components. The anomaly classification process helps in maintaining the integrity and performance of the infrastructure by identifying and addressing issues proactively.

Figure 4:
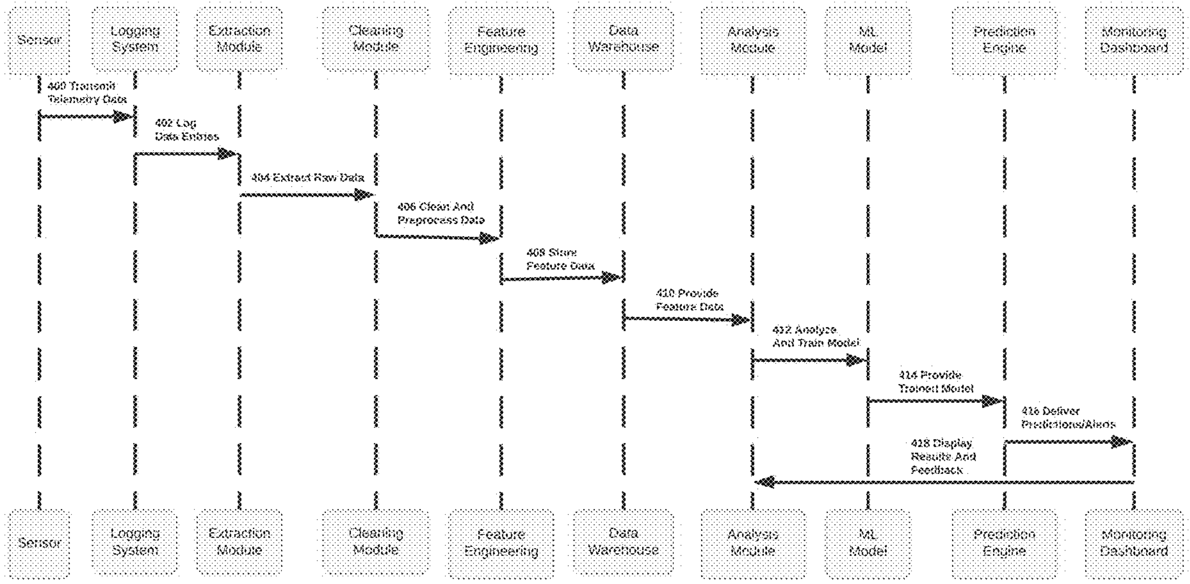
FIG. 4: Sequence Diagram—This diagram outlines the sequence of operations for processing telemetry data, from data collection and logging to analysis and prediction. It details the interactions between different system components in chronological order.

Regarding FIG. 4, the sequence diagram for the first invention illustrates the process flow for real-time anomaly prediction using telemetry data from various infrastructure components. Each step in the sequence is numbered and describes the interaction between different system components, modules, and elements involved in data processing, analysis, and prediction.

The process begins with step 400, which involves the transmission of telemetry data from various sensors installed on infrastructure components such as firewalls, switches, servers, and storage devices. These sensors are responsible for collecting real-time metrics such as CPU usage, memory consumption, network traffic, and error rates. This data provides a continuous stream of information about the operational status and performance of each component.

In step 402, the transmitted telemetry data is logged by the logging system. The logging system is designed to capture and record telemetry data entries in real-time, ensuring that all collected data points are accurately documented as they occur. This real-time logging is crucial for maintaining a continuous and up-to-date dataset that reflects the current state of the infrastructure components.

Next, in step 404, the data extraction module extracts the raw telemetry data from the logging system. This module's primary function is to isolate the relevant data sets needed for further analysis, ensuring that only pertinent information is processed in the subsequent steps. By filtering out unnecessary data, the extraction module helps streamline the data processing workflow and enhances the efficiency of the system.

The extracted raw data is then cleaned and preprocessed by the data cleaning module in step 406. This step involves several critical tasks, including removing noise, irrelevant information, and errors from the telemetry data. The data cleaning module handles missing values, smooths outliers, and normalizes the data to ensure high-quality input for the next stage. By improving data quality, the system can produce more accurate and reliable predictions.

In step 408, the cleaned data is transformed into feature data by the feature engineering module. Feature engineering is a crucial step that involves creating or modifying features that enhance the performance of machine learning models. This process may include calculating moving averages, identifying trend lines, and generating interaction terms between different metrics. The goal is to derive meaningful insights from the raw data that can be used to train more effective predictive models.

The engineered feature data is then provided to the data warehouse in step 410. The data warehouse serves as a centralized storage solution designed to hold large-scale data sets. It allows for efficient access and retrieval of data for analysis and modeling purposes. By storing the feature data in a structured and organized manner, the data warehouse supports the seamless integration of data into the machine learning workflow.

In step 412, the analysis module uses the stored feature data to analyze and train the machine learning model. This step involves feeding the feature data into the machine learning model and adjusting model parameters to learn the underlying patterns and behaviors of the infrastructure components. The analysis module performs various tasks, including selecting appropriate algorithms, tuning hyperparameters, and evaluating model performance. The objective is to develop a predictive model that accurately identifies anomalies based on historical and real-time data.

Once the machine learning model is trained, it is provided to the prediction engine in step 414. The prediction engine leverages the trained model to predict anomalies in the telemetry data. This involves running the model on new incoming data to identify potential issues or deviations from normal behavior. The prediction engine continuously monitors the telemetry data stream, comparing observed patterns against learned models to detect anomalies in real-time.

In step 416, the prediction engine delivers predictions and alerts based on the model's analysis. These predictions indicate whether a given data point represents a normal state or an anomaly. When an anomaly is detected, the system generates alerts to notify operators of potential issues. This timely detection and alerting enable operators to take proactive measures to address emerging problems before they escalate into critical incidents.

The final step, step 418, involves displaying the results and feedback on the monitoring dashboard. The monitoring dashboard provides a visual representation of the predictions and alerts, allowing operators to monitor the health and performance of the infrastructure components in real-time. The dashboard presents key metrics, trend analyses, and anomaly reports, offering a comprehensive overview of the system's status. Additionally, it provides feedback on the accuracy and effectiveness of the predictions, enabling continuous improvement of the system. Operators can use this feedback to refine the machine learning models, adjust thresholds, and optimize the overall performance of the anomaly detection system.

In this system, the sensors installed on various infrastructure components are responsible for collecting real-time telemetry data, including metrics such as CPU usage, memory consumption, network traffic, and error rates. The logging system captures and records telemetry data entries in real-time, ensuring a continuous and up-to-date stream of data is available for processing. The data extraction module extracts raw telemetry data from the logging system, isolating relevant data sets for further analysis. The data cleaning module then cleans and preprocesses the extracted data, removing noise, irrelevant information, and errors, and handling missing values, smoothing outliers, and normalizing the data.

The feature engineering module stores the cleaned data as feature data, transforming it into a set of engineered features that enhance the performance of machine learning models. The data warehouse holds the engineered feature data, allowing efficient access and retrieval for analysis and modeling purposes. The analysis module uses the stored feature data to train the machine learning model, feeding the feature data into the model and adjusting parameters to learn the underlying patterns of the infrastructure components. The trained machine learning model is then provided to the prediction engine, which uses the model to predict anomalies in the telemetry data. The prediction engine delivers predictions and alerts based on the model's analysis, indicating whether a data point represents a normal state or an anomaly. The results and feedback are displayed on the monitoring dashboard, providing a visual representation of the predictions and alerts, and enabling operators to monitor the health and performance of the infrastructure components in real-time, while also offering feedback on the accuracy and effectiveness of the predictions for continuous system improvement.

Figure 5:
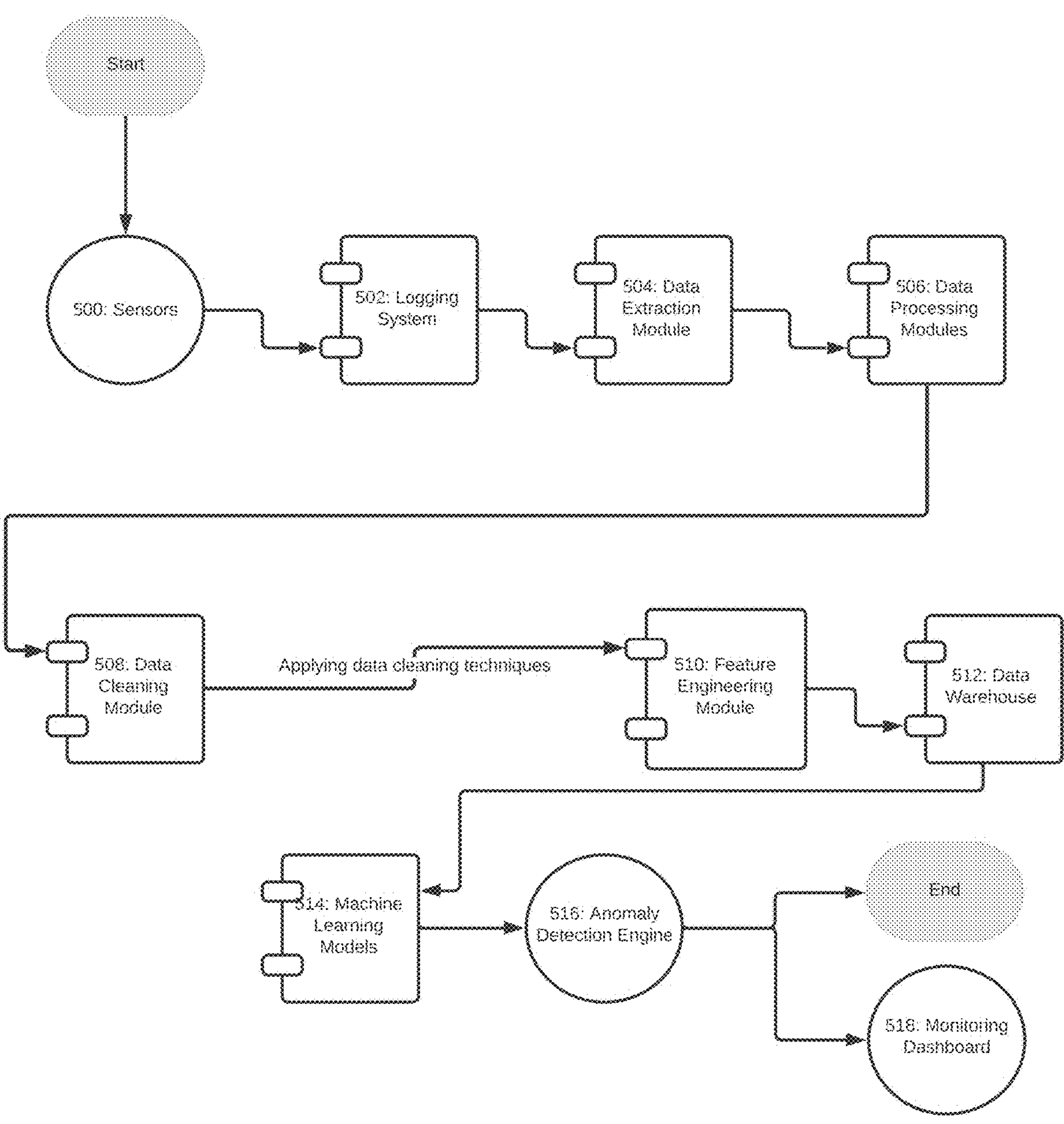
FIG. 5: Component Diagram—This diagram illustrates the different components involved in the system and their interactions. It highlights the roles of sensors, logging systems, data extraction modules, and machine learning models in the overall process.

FIG. 5, by way of non-limiting disclosure, depicts a sample component diagram of the first invention and provides an intricate and detailed representation of the system designed for real-time anomaly prediction using near real-time data. The process begins with sensors, denoted as component 500, installed on various critical infrastructure components, including firewalls, switches, servers, and storage devices. These sensors are crucial as they continuously monitor and collect real-time telemetry data encompassing essential metrics such as CPU usage, memory consumption, network traffic, and error rates. The primary function of these sensors is to provide a constant stream of data that reflects the operational status and performance of each infrastructure component, ensuring that any deviations or anomalies are quickly identified.

The telemetry data gathered by the sensors is then transmitted to the logging system, labeled as component 502. The logging system is responsible for capturing and recording the telemetry data entries in real-time. This real-time logging capability is vital because it ensures that every data point is documented accurately and immediately as it occurs. By maintaining a continuous and up-to-date dataset, the logging system helps create a reliable foundation for subsequent data processing and analysis. The logged data serves as a comprehensive record that reflects the current state and historical performance of the infrastructure components.

Following data logging, the data extraction module, marked as component 504, comes into play. This module's primary function is to extract the raw telemetry data from the logging system. During this extraction process, the module isolates the relevant data sets required for further analysis, ensuring that only pertinent information is passed on for processing. By filtering out unnecessary or redundant data, the extraction module enhances the efficiency of the data processing workflow and helps streamline the overall system operations.

Once the data is extracted, it undergoes a cleaning and preprocessing phase conducted by the data cleaning module, identified as component 506. The data cleaning module performs several critical tasks aimed at improving the quality of the telemetry data. This includes removing noise, irrelevant information, and errors, as well as handling missing values and smoothing out outliers. Normalizing the data is also a crucial step in this phase, as it ensures that the input data is consistent and standardized, which is essential for accurate analysis and reliable predictions. By enhancing data quality, the cleaning module plays a pivotal role in ensuring that the subsequent stages of data processing are based on accurate and reliable data.

The cleaned data is then transferred to the data processing modules, labeled as component 508. These modules perform complex data transformations and computations necessary for feature engineering. Feature engineering, conducted by the feature engineering module (510), is a critical process that involves creating or modifying features to enhance the performance of machine learning models. This process may include calculating moving averages, identifying trend lines, and generating interaction terms between different metrics.

The goal of feature engineering is to derive meaningful insights and patterns from the raw data that can be used to train more effective predictive models. By transforming the cleaned data into a set of engineered features, this module ensures that the machine learning models have the best possible input data for training and prediction.

Once the features are engineered, the data is stored in the data warehouse, marked as component 512. The data warehouse serves as a centralized storage solution designed to hold large-scale data sets. It provides efficient access and retrieval capabilities, allowing data scientists and analysts to access the data quickly for further analysis and modeling. By storing the feature data in a structured and organized manner, the data warehouse supports the seamless integration of data into the machine learning workflow. This centralized storage also facilitates the management and maintenance of large volumes of data, ensuring that the system can scale as the amount of telemetry data grows.

The machine learning models, housed in component 514, are then trained using the feature data stored in the data warehouse. The analysis module performs various tasks during this training phase, including selecting appropriate algorithms, tuning hyperparameters, and evaluating model performance. The objective is to develop predictive models that accurately identify anomalies based on historical and real-time data. By learning the underlying patterns and behaviors of the infrastructure components, the machine learning models can make precise predictions about potential anomalies.

Once the machine learning models are trained, they are provided to the anomaly detection engine, labeled as component 516. The anomaly detection engine leverages the trained models to predict anomalies in the telemetry data. This involves running the models on new incoming data to identify potential issues or deviations from normal behavior. The prediction engine continuously monitors the telemetry data stream, comparing observed patterns against learned models to detect anomalies in real-time. This real-time monitoring capability is crucial for ensuring that any deviations from expected behavior are quickly identified and addressed.

When anomalies are detected, the anomaly detection engine delivers predictions and alerts to the monitoring dashboard, identified as component 518. The monitoring dashboard provides a visual representation of the predictions and alerts, allowing operators to monitor the health and performance of the infrastructure components in real-time. The dashboard presents key metrics, trend analyses, and anomaly reports, offering a comprehensive overview of the system's status. Additionally, it provides feedback on the accuracy and effectiveness of the predictions, enabling continuous improvement of the system. Operators can use this feedback to refine the machine learning models, adjust thresholds, and optimize the overall performance of the anomaly detection system.

In summary, the component diagram of FIG. 5 illustrates a well-integrated system where each module and element plays a vital role in ensuring accurate and timely anomaly prediction. The process starts with sensors (500) collecting real-time telemetry data from firewalls (502), switches (504), servers (506), and storage devices (508). The logging system (510) captures and records this data. The data extraction module (512) isolates relevant data sets for further analysis. The data cleaning module (514) preprocesses the data, removing noise, irrelevant information, and errors, and handling missing values, smoothing outliers, and normalizing the data. The feature engineering module (516) transforms the cleaned data into a set of engineered features that enhance the performance of machine learning models. The data warehouse (518) holds the engineered feature data, allowing efficient access and retrieval for analysis and modeling purposes. The analysis module (520) uses the stored feature data to train the machine learning model, feeding the feature data into the model and adjusting parameters to learn the underlying patterns of the infrastructure components. The trained machine learning model is then provided to the prediction engine (522), which uses the model to predict anomalies in the telemetry data. The prediction engine delivers predictions and alerts based on the model's analysis, indicating whether a data point represents a normal state or an anomaly. The results and feedback are displayed on the monitoring dashboard (524), providing a visual representation of the predictions and alerts, and enabling operators to monitor the health and performance of the infrastructure components in real-time, while also offering feedback on the accuracy and effectiveness of the predictions for continuous system improvement. This comprehensive system ensures that the infrastructure components' health and performance are monitored and maintained effectively.

Figure 6:
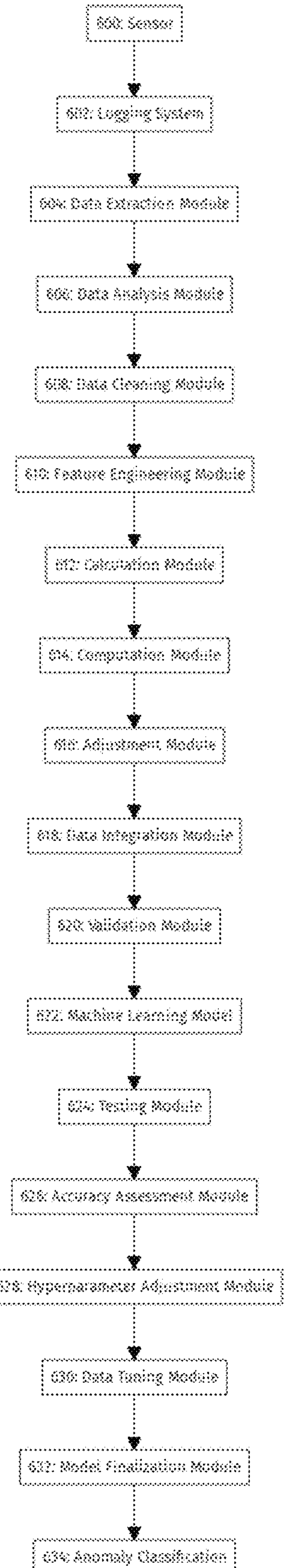
FIG. 6: System Architecture Diagram—This is another representation of the system architecture, focusing on different aspects or perspectives not covered in FIG. 1. It emphasizes the structural organization and relationships among system components.

FIG. 6, by way of non-limiting disclosure, depicts a sample system architecture for the second technical solution that begins with the Sensor (600), which is responsible for collecting telemetry data from a wide range of infrastructure components, including firewalls, switches, servers, and storage devices. The sensor meticulously gathers various critical metrics that are vital for monitoring the health and performance of these components. These metrics include CPU usage, memory consumption, network traffic, error rates, disk usage, I/O operations, and latency. By capturing this diverse array of data, the sensor ensures that the system has a comprehensive view of the infrastructure's operational state, enabling it to detect potential issues early.

Once the data is collected, it is passed to the Logging System (602), which logs the telemetry data in real-time. This logging process is crucial as it ensures that every data point is recorded precisely at the moment it occurs, maintaining a continuous and accurate record of the telemetry data. The real-time logging capability is fundamental to the system's effectiveness, as it provides a reliable data stream that reflects the current state of the infrastructure. This immediate logging allows the system to process and analyze data without delays, which is essential for real-time anomaly detection.

The Data Extraction Module (604) then takes over, extracting the logged telemetry data from the real-time log for further processing. This module is designed to efficiently isolate the relevant data sets required for subsequent analysis steps. By quickly and accurately retrieving large volumes of data, the extraction module ensures that the system can continuously monitor and analyze the infrastructure's performance. This efficiency is critical for maintaining the timeliness and relevance of the data being analyzed.

Once the data is extracted, the Data Analysis Module (606) performs an initial analysis to identify patterns, trends, and any existing anomalies within the data. This module plays a crucial role in understanding the structure of the data and detecting early signs of issues that could impact the infrastructure's performance. By recognizing these patterns and anomalies, the system can take proactive measures to prevent potential problems, ensuring the smooth operation of the infrastructure.

Following the initial analysis, the Data Cleaning Module (608) processes the telemetry data to remove noise, irrelevant information, and errors. This module employs advanced techniques to handle missing values, such as k-nearest neighbors imputation, multiple imputation by chained equations (MICE), or deep learning-based models. Additionally, it smooths outliers and normalizes the data to ensure high-quality data for further processing. Cleaning the data is a critical step as it enhances the accuracy and reliability of the analysis and the subsequent steps, ensuring that the insights derived from the data are based on accurate and relevant information.

The cleaned data then undergoes feature engineering by the Feature Engineering Module (610). This module is tasked with creating new features or modifying existing ones to enhance the performance of the machine learning models. It calculates moving averages, trend lines, and interaction terms between different metrics to provide a richer set of features for the models to learn from. By engineering composite features that capture interactions between multiple metrics, this module significantly improves the model's ability to accurately predict anomalies.

Next, the Calculation Module (612) computes the weighted mean of previous telemetry data values, using weights that are the inverse of the distance from the current time. This dynamic adjustment ensures that the weighted mean adapts to changing data patterns, providing an accurate baseline for extrapolation. The weighted mean prioritizes recent data, ensuring that the most current information has the greatest influence on the predictions, which is crucial for maintaining the relevance and accuracy of the extrapolated values.

The Computation Module (614) operates in parallel, calculating both first-order and second-order differences between consecutive previous telemetry data values and their weighted mean. The first-order differences capture immediate changes in the data, reflecting short-term fluctuations. Meanwhile, the second-order differences capture the acceleration or deceleration in data trends, providing a deeper understanding of the data's dynamics. The module employs a smoothing algorithm to reduce the influence of short-term noise, ensuring a more accurate representation of long-term trends.

The Adjustment Module (616) then adjusts the extrapolated value for the current time based on the first-order and second-order differences. This fine-tuning process ensures that the predicted value accurately reflects the current state of the infrastructure components. If necessary, the module can incorporate higher-order differences to capture more complex data patterns and behaviors, further enhancing the accuracy and reliability of the extrapolated value.

Once the value is adjusted, the Data Integration Module (618) integrates the extrapolated value into the dataset, creating a continuous telemetry data stream. This integration step is essential for maintaining the integrity and continuity of the data, ensuring that the subsequent analysis steps can rely on a consistent and complete dataset. The integrated data stream provides a seamless flow of information, which is critical for real-time processing and analysis.

The Validation Module (620) plays a crucial role in ensuring the accuracy of the extrapolated telemetry data. By comparing the extrapolated values with actual telemetry data once it becomes available, this module validates the predictions and assesses their accuracy. This validation process includes using a feedback loop to continuously improve the weighting mechanisms and extrapolation parameters, adapting to evolving data patterns and maintaining high accuracy over time.

The validated telemetry data is then used to train the Machine Learning Model (622). This model learns underlying patterns in the data, improving its predictive capabilities. The training process involves feeding the telemetry data into the model and adjusting the model parameters to optimize the learning process. This step is crucial for building a robust model that can accurately predict anomalies, providing reliable insights into the infrastructure's performance.

To ensure the model's performance, the Testing Module (624) tests the trained machine learning model using a separate validation dataset. This testing evaluates how well the model generalizes to new, unseen data, which is essential for verifying its effectiveness in real-world scenarios. By assessing the model's performance on a validation dataset, the system ensures that the model's predictions are both reliable and accurate.

The Accuracy Assessment Module (626) assesses the accuracy of the machine learning model using various performance metrics such as precision, recall, F1 score, or mean absolute error. This assessment provides a comprehensive evaluation of the model's performance and reliability, identifying areas where the model may need improvement and ensuring that it meets the desired accuracy standards.

If the desired accuracy is not achieved, the Hyperparameter Adjustment Module (628) iteratively adjusts the hyperparameters of the machine learning model. This process involves fine-tuning parameters such as learning rate, number of layers, or number of trees in a random forest to optimize the model's performance. By carefully adjusting these parameters, the module enhances the model's predictive accuracy and overall performance.

The Data Tuning Module (630) further improves model performance by tuning the telemetry data. This module performs feature selection to choose the most relevant features, feature scaling to adjust the range of data values, and creates synthetic data to balance the dataset. These tuning efforts ensure that the machine learning model is trained on high-quality, well-prepared data, enhancing its ability to make accurate and reliable predictions.

Once the desired accuracy is achieved, the Model Finalization Module (632) finalizes the machine learning model. This involves fixing the model parameters and preparing it for deployment, ensuring that the model is stable and ready for use in a production environment. Finalizing the model is a critical step in transitioning from development to operational use, providing a reliable tool for real-time anomaly detection.

The finalized machine learning model then performs Anomaly Classification (634), where it classifies anomalies in the telemetry data. The model predicts whether a given data point represents a normal state or an anomaly. When an anomaly is detected, the system triggers appropriate automated incident response actions, such as generating detailed reports and alerts. These responses help prevent potential operational and reputational losses, ensuring continuous monitoring and protection of the infrastructure components. By leveraging advanced data analysis, machine learning, and real-time processing, the system enhances the operational resilience and reliability of the infrastructure, enabling proactive maintenance and swift incident response.

Figure 7:
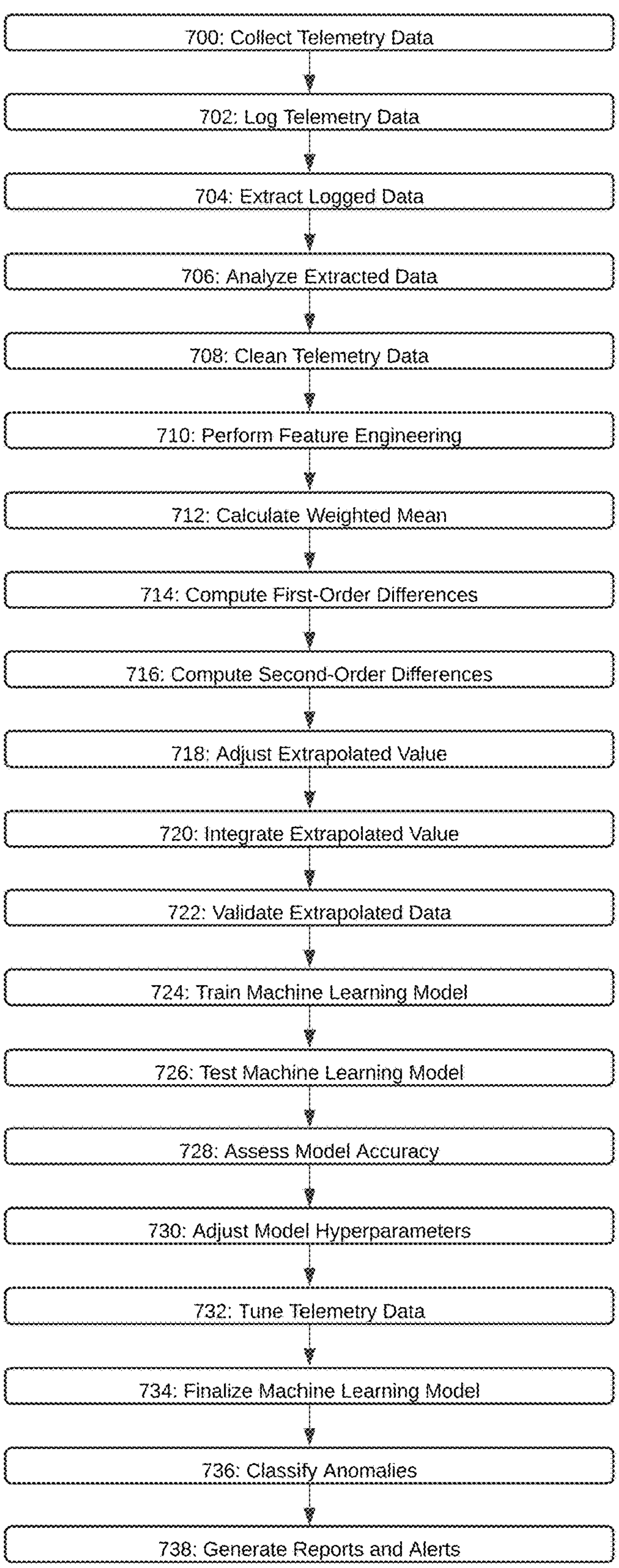
FIG. 7: Flow Diagram—This diagram provides a detailed flow of the steps involved in anomaly prediction, starting from telemetry data collection to generating reports and alerts. Each step is numbered sequentially, showing the process flow.

FIG. 7, by way of non-limiting disclosure, depicts a sample detailed method for real-time anomaly prediction using near real-time data using the second invention, organized into a series of interconnected steps. The process begins at step 700, where sensors collect telemetry data from various infrastructure components such as firewalls, switches, servers, and storage devices. This data captures essential metrics including CPU usage, memory consumption, network traffic, and error rates, providing a comprehensive view of the system's performance and potential issues.

In step 702, the collected telemetry data is logged in real-time by a logging system. This logging ensures that every data point is recorded as it occurs, creating a continuous and accurate record of the telemetry data. This real-time logging is crucial for subsequent analysis as it preserves the integrity and immediacy of the data.

Following this, in step 704, a data extraction module retrieves the logged telemetry data from the real-time log. This extraction is essential for isolating the relevant data sets required for further analysis and processing. The module efficiently isolates and prepares the data for the next steps, ensuring that only pertinent information is passed on.

In step 706, the data analysis module analyzes the extracted telemetry data. This analysis aims to identify patterns, trends, and any existing anomalies within the data. By scrutinizing the data, the system can detect early signs of issues that might impact the infrastructure's performance, thus enabling preemptive measures to address these potential problems.

Next, in step 708, the data cleaning module processes the telemetry data to remove noise, irrelevant information, and errors. This includes handling missing values, smoothing outliers, and normalizing the data. Cleaning the data is a critical step that enhances the accuracy and reliability of the subsequent analysis by ensuring that the data set used is of high quality and free from distortions.

In step 710, the feature engineering module transforms the cleaned telemetry data to create or modify features that improve the performance of the machine learning model. This involves calculating moving averages, trend lines, and interaction terms between different metrics, which enrich the data set with more informative inputs that enhance the model's predictive capabilities.

Step 712 involves calculating the weighted mean of a series of previous telemetry data values. The calculation module assigns weights inversely proportional to the distance from the current time, providing a baseline value for extrapolation. This step is foundational for the subsequent analysis of temporal trends in the data.

The process continues with step 714, where the computation module determines the first-order differences between consecutive previous telemetry data values and their weighted mean. These first-order differences highlight immediate changes in the data, capturing short-term variations that are critical for accurate anomaly detection.

In step 716, the computation module also calculates second-order differences between consecutive previous telemetry data values and their weighted mean. These second-order differences reveal the rate of change and its own trends, capturing acceleration or deceleration in data trends, which are essential for understanding the dynamics of the telemetry data.

In step 718, an adjustment module refines the extrapolated value for the current time using the first-order and second-order differences. This adjustment ensures that the predicted value accurately reflects the current state of the infrastructure components, enhancing the precision of the anomaly prediction.

The adjusted extrapolated value is then integrated into the dataset in step 720 by a data integration module. This integration creates a continuous telemetry data stream, maintaining the integrity and continuity of the data for further analysis. It ensures that the dataset remains coherent and usable for ongoing predictive tasks.

In step 722, the extrapolated telemetry data is validated by comparing it with actual telemetry data once it becomes available. A validation module assesses the accuracy of the extrapolation process and makes necessary adjustments to improve future predictions, ensuring that the model's forecasts remain reliable over time.

Subsequently, in step 724, the machine learning model is trained using the validated telemetry data. This training involves feeding the data into the model to learn underlying patterns and improve its predictive capabilities, enabling the model to accurately identify anomalies based on historical and real-time data.

In step 726, the trained machine learning model undergoes rigorous testing using a separate validation dataset. This testing evaluates the model's performance and ensures it generalizes well to new, unseen data, thus verifying the model's robustness and applicability to real-world scenarios.

The accuracy of the machine learning model is assessed in step 728 using metrics such as precision, recall, F1 score, or mean absolute error. This accuracy assessment determines the model's performance and reliability, providing insights into areas where the model may need further refinement.

If the desired accuracy is not achieved, step 730 involves adjusting the hyperparameters of the machine learning model. A hyperparameter adjustment module optimizes the model's performance through iterative fine-tuning of parameters such as learning rate, number of layers, or number of trees in a random forest, ensuring the model reaches optimal performance.

In step 732, a data tuning module further enhances the model's performance by tuning the telemetry data. This includes feature selection, feature scaling, and creating synthetic data to balance the dataset, ensuring that the data used for training is of the highest quality and most relevant to the predictive task.

Once the desired accuracy is achieved, step 734 involves finalizing the machine learning model. The model finalization module fixes the model parameters and prepares it for deployment, ensuring that the model is stable and ready for operational use.

In step 736, the finalized machine learning model classifies anomalies in the telemetry data. This classification predicts whether a given data point represents a normal state or an anomaly, enabling timely detection and response to potential issues.

Finally, in step 738, the system generates detailed reports and alerts based on the classification results. These reports and alerts trigger automated incident response actions to prevent potential operational and reputational losses, ensuring continuous monitoring and protection of the infrastructure components.

This comprehensive process ensures the reliability and performance of the infrastructure by accurately predicting anomalies using near real-time data, maintaining the system's operational integrity and preventing potential disruptions.

Figure 8:
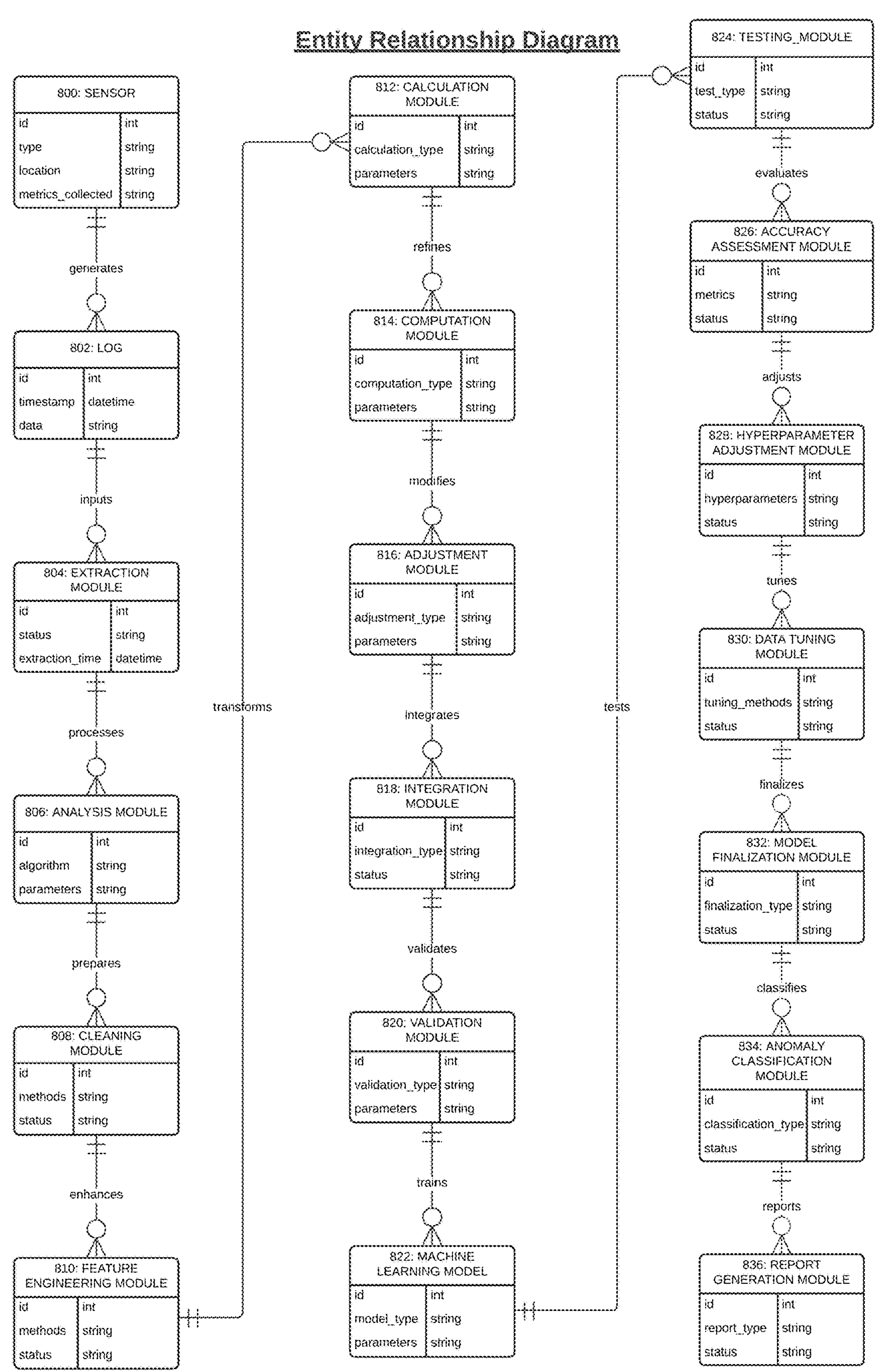
FIG. 8: Entity Relationship Diagram—This diagram is similar to FIG. 3 but includes more detailed attributes and relationships between entities. It elaborates on the data structures and how they interact within the system.

FIG. 8, by way of non-limiting description, is a sample entity relationship diagram for the second aspect of the invention and illustrates the interactions and relationships between various modules and components in the real-time anomaly prediction system.

The process begins with the Sensor (800) entity, which is responsible for collecting telemetry data from various infrastructure components such as firewalls, switches, servers, and storage devices. This data includes metrics such as CPU usage, memory consumption, network traffic, and error rates. The Sensor (800) entity generates logs that are fed into the Log (802) entity.

The Log (802) entity stores the telemetry data, capturing it in real-time to create a continuous record. This log data is then input to the Extraction Module (804) entity, which extracts the logged telemetry data for further analysis and processing.

The Extraction Module (804) processes the data and passes it to the Analysis Module (806) entity. The Analysis Module (806) employs various algorithms and parameters to identify patterns, trends, and anomalies in the data, preparing it for further cleaning.

The Cleaning Module (808) entity uses methods to remove noise, irrelevant information, and errors from the data, ensuring its quality and reliability. This cleaned data is then enhanced by the Feature Engineering Module (810) entity, which creates or modifies features to improve the machine learning model's performance.

The Calculation Module (812) entity calculates the weighted mean of previous telemetry data values, providing a baseline value for extrapolation. This data is further refined by the Computation Module (814) entity, which computes first-order and second-order differences to capture immediate changes and trends in the data.

The Adjustment Module (816) entity modifies the extrapolated value based on these computations to ensure it accurately reflects the current state of the infrastructure components. This adjusted value is then integrated into the dataset by the Integration Module (818) entity, maintaining the data's integrity and continuity.

The Validation Module (820) entity validates the extrapolated telemetry data by comparing it with actual data, making necessary adjustments to improve future predictions. The validated data is used to train the Machine Learning Model (822) entity, which learns underlying patterns and enhances its predictive capabilities.

The trained model is tested by the Testing Module (824) entity using a separate validation dataset, ensuring the model generalizes well to new, unseen data. The Accuracy Assessment Module (826) entity evaluates the model's performance using metrics such as precision, recall, F1 score, or mean absolute error.

If the desired accuracy is not achieved, the Hyperparameter Adjustment Module (828) entity optimizes the model's performance through iterative fine-tuning. The Data Tuning Module (830) entity further improves model performance by tuning the telemetry data, including feature selection, scaling, and creating synthetic data.

Once the model achieves the desired accuracy, it is finalized by the Model Finalization Module (832) entity, preparing it for deployment. The Anomaly Classification Module (834) entity uses the finalized model to classify anomalies in the telemetry data, predicting whether a given data point represents a normal state or an anomaly.

Finally, the Report Generation Module (836) entity generates detailed reports and alerts based on the classification results, triggering automated incident response actions to prevent potential operational and reputational losses.

This entity relationship diagram showcases the detailed interaction and dependencies between different components and modules within the system, ensuring a comprehensive approach to real-time anomaly prediction using near real-time data.

Figure 9:
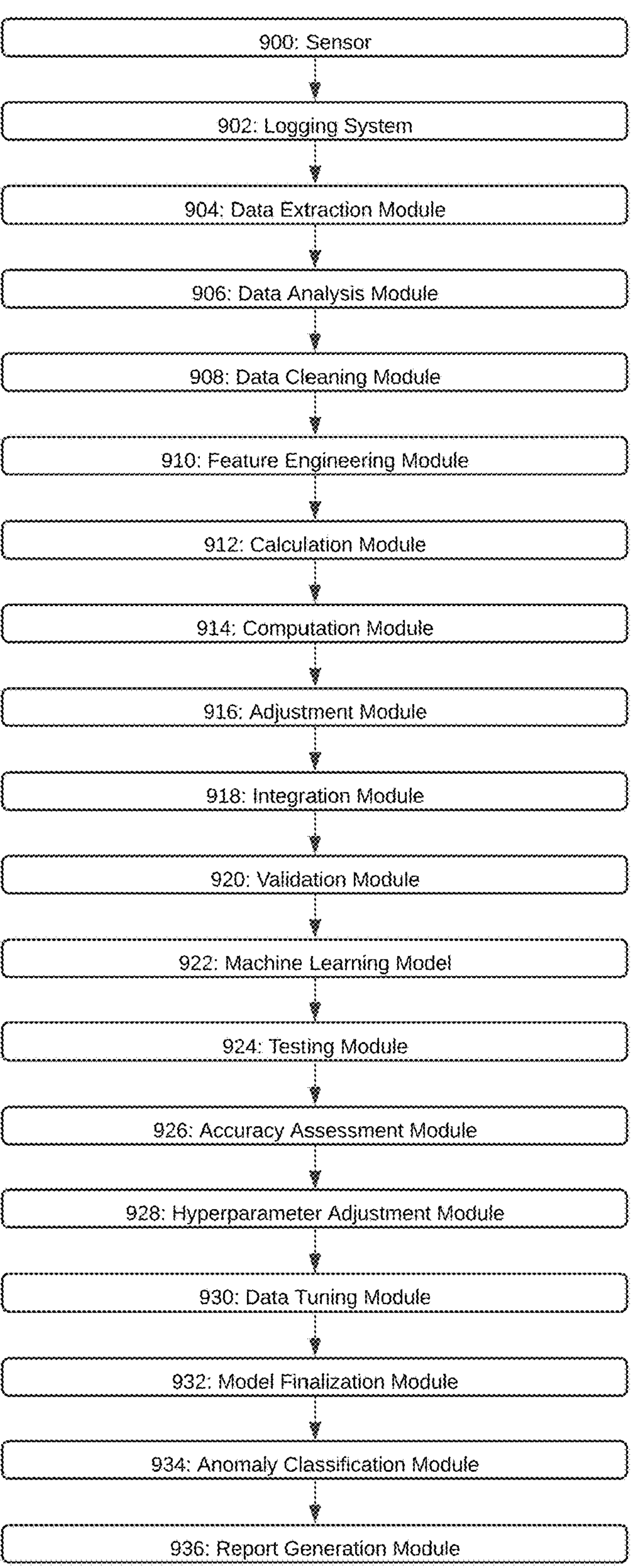
FIG. 9: Component Diagram—This diagram details the specific components involved in the system, including their identifiers and roles. It provides a clear understanding of the system's modular structure and the functions of each component.

FIG. 9, by way of non-limiting example is a sample component diagram for the second aspect of the invention and illustrates the flow and interactions between various components in the real-time anomaly prediction system. Each component is assigned a unique identifier to facilitate understanding of their roles and relationships within the system.

The process initiates with the Sensor (900) component, which is responsible for collecting telemetry data from various infrastructure elements including firewalls, switches, servers, and storage devices. This sensor captures critical metrics such as CPU usage, memory consumption, network traffic, and error rates, forming the basis for subsequent analysis.

Once the telemetry data is collected, it is transmitted to the Logging System (902) component. This component logs the collected telemetry data in real-time, creating a continuous and accurate record that is essential for further analysis. The real-time logging ensures that every data point is captured precisely at the moment it occurs.

The logged data is then extracted by the Data Extraction Module (904) component. This module isolates the relevant data sets from the real-time log, preparing them for further processing and analysis. It ensures the efficient retrieval of data necessary for monitoring and evaluating the infrastructure's performance.

Following extraction, the data moves to the Data Analysis Module (906) component. This module employs algorithms to analyze the extracted telemetry data, identifying patterns, trends, and any existing anomalies. This initial analysis is crucial for detecting early signs of potential issues.

The analyzed data is subsequently processed by the Data Cleaning Module (908) component. This component cleans the telemetry data by removing noise, irrelevant information, and errors. It handles missing values, smooths outliers, and normalizes the data to ensure high quality and reliability for further processing.

Once cleaned, the data is enhanced by the Feature Engineering Module (910) component. This module performs feature engineering to create or modify features that improve the performance of the machine learning model. It calculates moving averages, trend lines, and interaction terms between different metrics, providing a richer set of features for the model.

The enhanced data is then processed by the Calculation Module (912) component, which calculates the weighted mean of previous telemetry data values. This calculation serves as a baseline for further analysis. Following this, the Computation Module (914) component computes first-order and second-order differences to capture immediate changes and trends in the data, refining the baseline values.

The refined data is adjusted by the Adjustment Module (916) component. This module fine-tunes the extrapolated values based on the computed differences, ensuring they accurately reflect the current state of the infrastructure components.

The adjusted data is integrated into the dataset by the Integration Module (918) component. This integration maintains the integrity and continuity of the telemetry data stream, preparing it for further validation and analysis.

The Validation Module (920) component validates the extrapolated data by comparing it with actual telemetry data once available. It assesses the accuracy of the extrapolation process and makes necessary adjustments to improve future predictions, ensuring the reliability of the data.

The validated data is used to train the Machine Learning Model (922) component. This component learns underlying patterns from the data, enhancing its predictive capabilities. The trained model is then tested by the Testing Module (924) component, which evaluates the model's performance using a separate validation dataset.

The model's accuracy is assessed by the Accuracy Assessment Module (926) component, using metrics such as precision, recall, F1 score, or mean absolute error. This assessment ensures the model's performance and reliability.

If the desired accuracy is not achieved, the Hyperparameter Adjustment Module (928) component optimizes the model's performance through iterative fine-tuning of parameters. This optimization is crucial for improving the model's predictive capabilities.

The Data Tuning Module (930) component further enhances the model's performance by tuning the telemetry data, including feature selection, feature scaling, and creating synthetic data to balance the dataset. This ensures the highest quality of data for training the model.

Once the desired accuracy is achieved, the Model Finalization Module (932) component finalizes the machine learning model, fixing the parameters and preparing it for deployment.

The finalized model is then used by the Anomaly Classification Module (934) component to classify anomalies in the telemetry data. This classification predicts whether a given data point represents a normal state or an anomaly, enabling timely detection and response to potential issues.

Finally, the Report Generation Module (936) component generates detailed reports and alerts based on the classification results, triggering automated incident response actions to prevent potential operational and reputational losses.

This component diagram showcases the comprehensive flow and dependencies between different components within the system, ensuring an effective approach to real-time anomaly prediction using near real-time data.

FIG. 10A-F, by way of non-limiting example is a sequence diagram broken down into multiple parts to provides a detailed representation of the process flow involved in real-time anomaly prediction using near real-time data. Each part of the diagram captures specific interactions between system components, demonstrating the step-by-step progression of data collection, processing, and analysis.

Figure 10A:
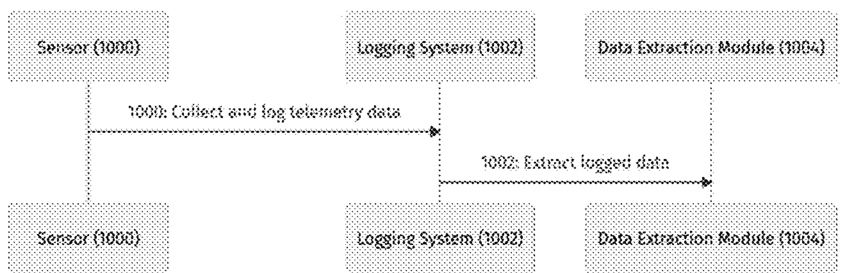
FIGS. 10A-F: Sequence Diagrams—These diagrams break down the sequence of operations into smaller parts, providing a more detailed view of each step in the process. They illustrate the interactions between system components in various scenarios, focusing on specific aspects of the sequence.

FIG. 10A: Initial Data Collection and Logging—In FIG. 10A, the process begins with the Sensor (1000) collecting telemetry data from various infrastructure elements such as firewalls, switches, servers, and storage devices. This telemetry data includes metrics like CPU usage, memory consumption, network traffic, and error rates. The Sensor (1000) transmits this collected telemetry data to the Logging System (1002), where it is logged in real-time. The Logging System (1002) ensures that every data point is captured accurately, creating a continuous and precise record for further analysis.

Figure 10B:
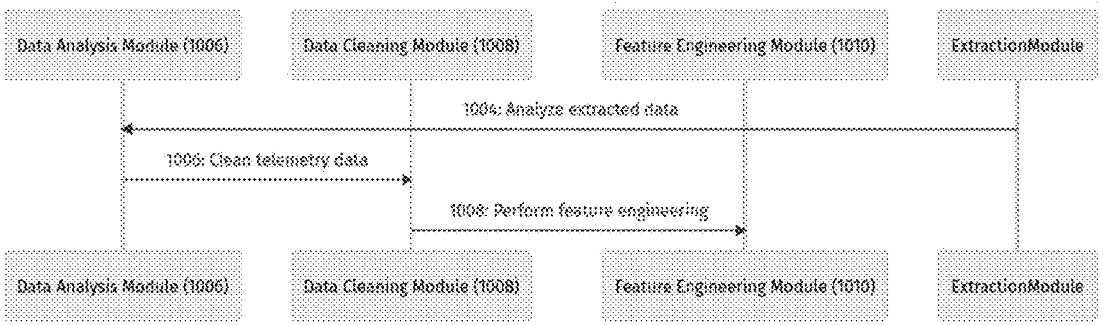

FIG. 10B: Data Extraction and Initial Processing-FIG. 10B shows the next steps where the Data Extraction Module (1004) extracts the logged telemetry data. This module isolates relevant data sets from the real-time log, preparing them for further analysis. The extracted data is then forwarded to the Data Analysis Module (1006). The Data Analysis Module (1006) analyzes the data to identify patterns, trends, and any existing anomalies. Following the analysis, the data is sent to the Data Cleaning Module (1008) for cleaning. The Data Cleaning Module (1008) removes noise, irrelevant information, and errors from the telemetry data, ensuring its quality and reliability. The cleaned data is subsequently passed to the Feature Engineering Module (1010), which enhances the data by creating or modifying features to improve the performance of the machine learning model.

Figure 10C:
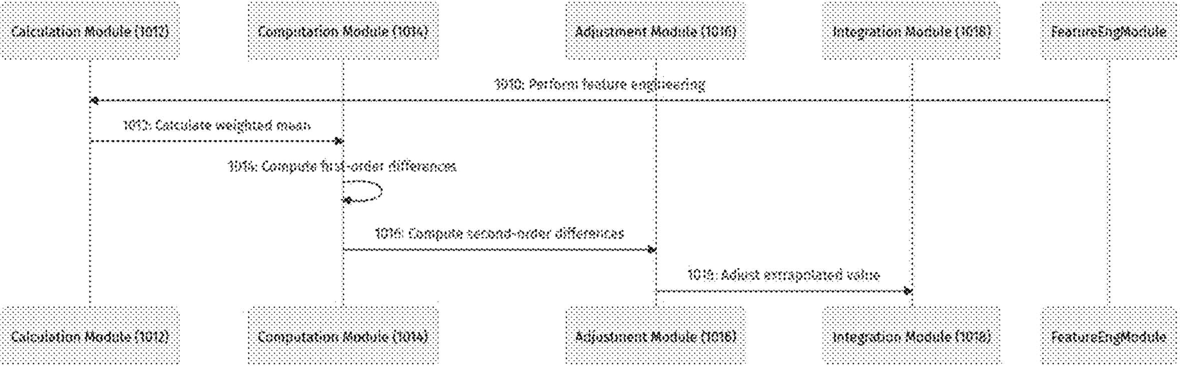

FIG. 10C: Feature Engineering and Data Refinement—In FIG. 10C, the Feature Engineering Module (1010) performs feature engineering on the cleaned telemetry data. The enhanced data is then processed by the Calculation Module (1012), which calculates the weighted mean of previous telemetry data values, providing a baseline for further analysis. This baseline data is refined by the Computation Module (1014), which computes first-order differences between consecutive previous telemetry data values to capture immediate changes. Additionally, the Computation Module (1014) computes second-order differences to determine variations in the rate of change and trends in the data. The refined data is then adjusted by the Adjustment Module (1016), ensuring the extrapolated value accurately reflects the current state of the infrastructure components.

Figure 10D:
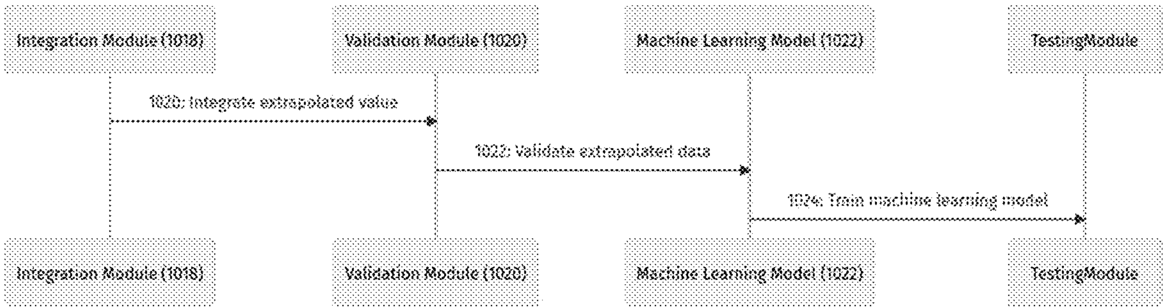

FIG. 10D: Data Integration and Validation-FIG. 10D depicts the adjusted extrapolated value being integrated into the dataset by the Integration Module (1018). This integration maintains the data's integrity and continuity. The integrated data is then validated by the Validation Module (1020), which assesses the accuracy of the extrapolation process by comparing it with actual telemetry data once it becomes available. The validated telemetry data is subsequently used to train the Machine Learning Model (1022). The Machine Learning Model (1022) learns underlying patterns from the data, enhancing its predictive capabilities.

Figure 10E:
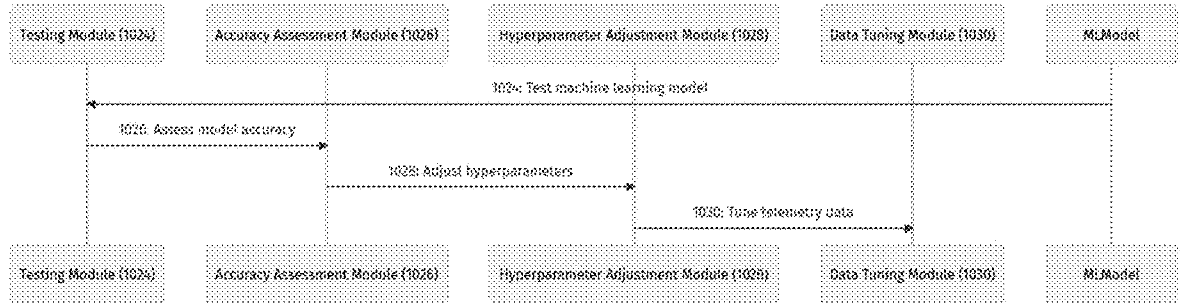

FIG. 10E: Model Testing and Optimization—In FIG. 10E, the trained model is tested by the Testing Module (1024), which evaluates the model's performance using a separate validation dataset. The accuracy of the machine learning model is assessed by the Accuracy Assessment Module (1026), using metrics such as precision, recall, F1 score, or mean absolute error. If the desired accuracy is not achieved, the Hyperparameter Adjustment Module (1028) optimizes the model's performance through iterative fine-tuning of parameters. The Data Tuning Module (1030) further enhances the model's performance by tuning the telemetry data, ensuring that it is of the highest quality and most relevant for the predictive task.

Figure 10F:
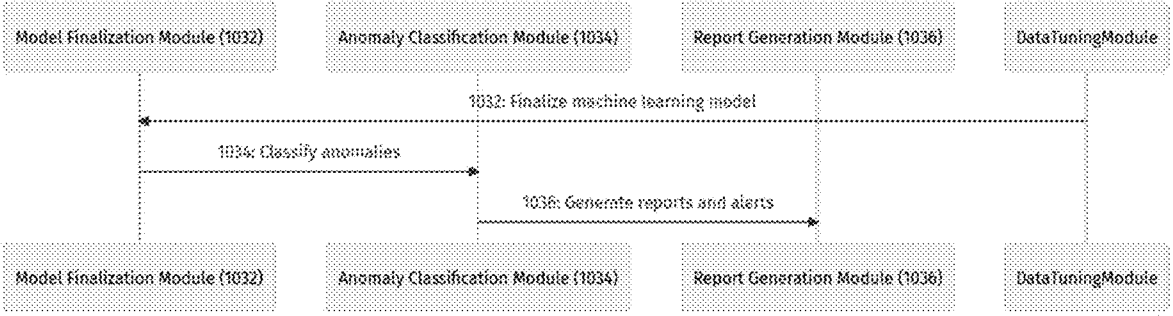

FIG. 10F: Finalization and Reporting-Finally, in FIG. 10F, once the model achieves the desired accuracy, the Model Finalization Module (1032) finalizes the machine learning model, preparing it for deployment. The finalized model is then used by the Anomaly Classification Module (1034) to classify anomalies in the telemetry data, predicting whether a given data point represents a normal state or an anomaly. The Report Generation Module (1036) generates detailed reports and alerts based on the classification results, triggering automated incident response actions to prevent potential operational and reputational losses.

These sequence diagrams collectively illustrate the detailed process flow and interactions between various components in the system, highlighting the systematic approach to real-time anomaly prediction using near real-time data.

In FIG. 11, the Chart of Sample Telemetry Data provides a comprehensive list of telemetry attributes that are essential for monitoring and analyzing the performance and health of infrastructure components. Each attribute is identified by a unique number, which helps in referencing and organizing the data effectively.

CPU Utilization (1100) represents the percentage of CPU capacity in use. For instance, a sample value of 0.35 indicates that 35% of the CPU's capacity is currently being utilized. This metric is crucial for identifying CPU bottlenecks or overutilization, which can lead to system slowdowns or crashes if not addressed.

Memory Usage (1102) shows the amount of RAM being used. A sample value of 8 GB out of a total of 16 GB highlights the current memory consumption. Monitoring memory usage helps in detecting memory leaks or insufficient memory allocation that can degrade application performance.

Network Traffic (Incoming) (1104) measures the data received by the network interface, with a sample value of 10 Mops, indicating the volume of incoming data. Similarly, Network Traffic (Outgoing) (1106) measures the data transmitted by the network interface, with a sample value of 5 Mbps. These metrics are vital for understanding network load and identifying potential network congestion or bandwidth issues.

The Number of Processes (1108) shows the total number of running processes, with a sample value of 120 active processes. This metric helps in understanding the system's load and managing process scheduling to ensure optimal performance.

Server Load (1 min) (1110) represents the average system load over the last minute, with a sample value of Load Average—5.5 Seconds. This metric provides insight into the system's recent performance and helps in identifying periods of high load that may require load balancing or resource scaling.

Network Latency (1112) indicates the time taken for data to travel between points on a network, with a sample value of 1.65 milliseconds. This metric is crucial for assessing network performance and detecting latency issues that can impact application responsiveness.

Disk Read Speed (1114) measures the speed at which data is read from the disk, with a sample value of 150 MB/s. Similarly, Disk Write Speed (1116) measures the speed at which data is written to the disk, with a sample value of 80 MB/s. These metrics are important for evaluating disk performance and ensuring that storage devices can handle the required read/write operations without becoming a bottleneck.

Response Time per KB Data (1118) shows the time taken to process each kilobyte of data, with a sample value of 50 ms. This metric indicates the system's data processing efficiency and helps in identifying performance issues that may need optimization.

Transactions per Second (1120) indicates the number of transactions processed per second, with a sample value of 200. This metric is vital for understanding the system's transaction handling capacity and ensuring that it can meet the required throughput.

Bandwidth Usage (1122) measures the amount of network bandwidth being utilized, with a sample value of 1,073,741, 824 Kilo Bytes. This metric provides a clear picture of network usage and helps in managing bandwidth allocation to prevent congestion.

Heat (1124) shows the degrees of a hardware component, with a sample value of 42.2° C. Monitoring heat is crucial for maintaining the health of hardware components and preventing overheating that can lead to hardware failures.

Application Response Time (1126) indicates the time taken for an application to respond to a request, with a sample value of 120 ms. This metric highlights application performance and helps in identifying response time issues that may affect user experience.

Application Throughput (1128) measures the rate at which an application processes data, with a sample value of 100 requests per second. This metric provides insight into application efficiency and capacity.

Disk Read Operations (1130) shows the number of read operations performed on the disk, with a sample value of 2000 per second, while Disk Write Operations (1132) shows the number of write operations performed on the disk, with a sample value of 1500 per second. Disk Input/Output Operations per Second (1134) indicates the number of input/output operations per second on the disk, with a sample value of 1200. These metrics are crucial for understanding disk activity and ensuring that storage devices can handle the required I/O operations without becoming a performance bottleneck.

Network Packets Received per Second (1136) measures the number of packets received per second, with a sample value of 1500, while Network Packets Transmitted per Second (1138) measures the number of packets transmitted per second, with a sample value of 800. These metrics are important for assessing network performance and managing network load.

Fan Speed (1140) shows the speed of a fan in the system, with a sample value of 1550 RPM. Monitoring fan speed is essential for ensuring proper cooling and preventing overheating of hardware components.

Incoming Network Traffic (1142) measures the data received by a network interface, with a sample value of 15 Mbps, while Outgoing Network Traffic (1144) measures the data transmitted by a network interface, with a sample value of 8 Mbps. These metrics provide a detailed view of network data flow and help in managing network resources effectively.

Power Consumption (1146) shows the amount of power being consumed, with a sample value of 155 Watts. Monitoring power consumption is important for energy management and ensuring that the system operates within safe power limits.

Finally, Disk Space (1148) indicates the amount of storage space available or used, with a sample value of 150/500 GB. This metric provides a clear understanding of storage utilization and helps in managing storage resources to prevent space shortages.

The telemetry data outlined in FIG. 11 is utilized in both the first and second technical solutions of the inventions.

In the first technical solution, this telemetry data is used for real-time monitoring and alerting of infrastructure performance. The collected telemetry attributes, such as CPU Utilization (1100), Memory Usage (1102), Network Traffic (Incoming and Outgoing) (1104, 1106), Disk Read Speed (1114), Disk Write Speed (1116), and Heat (1124), are continuously monitored to detect anomalies and potential issues. Real-time data collection by sensors transmits telemetry data to the logging system, which logs and stores this data for real-time analysis. Predefined thresholds are set for critical metrics, and if any metric exceeds its threshold, an alert is triggered. For example, if the CPU Utilization (1100) exceeds a certain percentage, or if the Heat (1124) of a component rises above a safe level, the system will generate alerts and notifications. This enables administrators to respond immediately to potential issues, such as overheating components, network congestion, or excessive memory usage, thereby preventing system failures and maintaining optimal performance. The real-time monitoring system ensures continuous visibility into the health and performance of the infrastructure, allowing for proactive management and quick resolution of issues before they escalate into critical problems.

In the second technical solution, the focus is on predictive anomaly detection using machine learning models trained on historical and real-time telemetry data. The rich set of telemetry attributes, including Application Response Time (1126), Application Throughput (1128), Disk Read Operations (1130), Disk Write Operations (1132), and Network Packets Received/Transmitted per Second (1136, 1138), provides a comprehensive dataset for training robust predictive models. The data is prepared and cleaned to remove noise and irrelevant information, ensuring high-quality input for the machine learning models. Relevant features are engineered from the telemetry data, capturing critical patterns and trends, such as the weighted mean and differences of metrics like CPU utilization and network traffic.

The machine learning model is trained on historical telemetry data to learn normal behavior patterns and validated using real-time data to ensure accuracy in predicting anomalies. Once validated, the model predicts potential anomalies by analyzing incoming telemetry data. For instance, if the Application Response Time (1126) suddenly increases beyond the usual range, or if the Network Packets Transmitted per Second (1138) drops significantly, the model can identify these as anomalies. If the model detects an anomaly, it triggers alerts and generates detailed reports, allowing proactive mitigation of issues before they impact the system. This approach ensures continuous monitoring and protection of infrastructure components, enabling administrators to address potential problems proactively and maintain system reliability. The predictive anomaly detection system leverages advanced machine learning techniques to provide early warnings of potential issues, allowing for timely interventions and reducing the risk of system downtime or performance degradation.

In summary, the Chart of Sample Telemetry Data in FIG. 11 provides critical metrics that are utilized in both real-time monitoring and predictive anomaly detection solutions. These metrics enable effective infrastructure management and proactive issue resolution, ensuring the health and performance of the system. The real-time monitoring solution provides continuous visibility and immediate alerts for potential issues, while the predictive anomaly detection solution uses machine learning to identify and mitigate potential problems before they affect system performance. Together, these solutions provide a comprehensive approach to managing and maintaining the health and performance of infrastructure components, ensuring reliability and optimal operation.

Figures 12A, 12B, 12C:
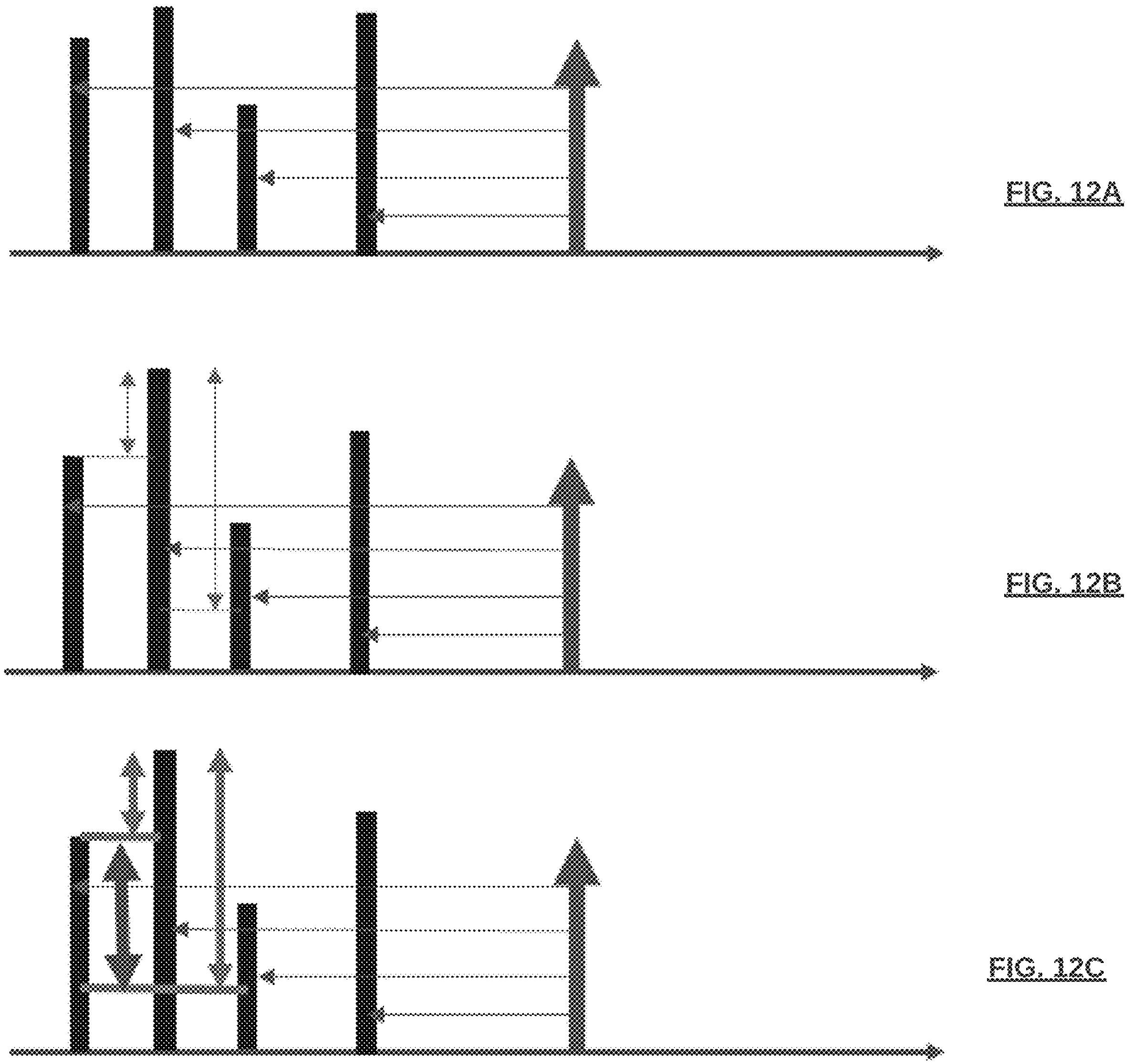
FIGS. 12A-C: Extrapolation Diagram—This illustrates a method for extrapolating to the current time using neighboring values. The extrapolation process involves three key components: the weighted mean of previous values, first order differences, and second order differences.

FIG. 12A-C illustrate a method for extrapolating to the current time using neighboring values. The extrapolation process involves three key components: the weighted mean of previous values, first order differences, and second order differences.

In FIG. 12A, the weighted mean of previous values is calculated by assigning weights to a certain number of previous values, where the weights are the inverse of the distance from the current value. This weighted mean helps estimate the current value based on its proximity to recent values.

In FIG. 12B, the first order differences between consecutive previous values are then considered. The weighted mean of these first order differences is used to compute the variation from the previous value, taking into account the trend and changes in the data. The weights here are also the inverse of the distance from the current value, ensuring that closer values have a greater influence.

Finally, in FIG. 12C, the method includes the second order differences between consecutive previous values. Similar to the first order differences, the weighted mean of the second order differences is used to compute the variation from the previous value, focusing on the trend and acceleration of changes. Again, the weights are the inverse of the distance from the current value, providing a comprehensive approach to extrapolating the current value by considering both recent values and their trends.

Sample first pseudocode for implementing the first technical solution for real-time monitoring and alerting using telemetry data is as follows.

```
//Initialization of thresholds for telemetry attributes
thresholds={
  "CPU_Utilization": 0.8, //80% CPU usage
  "Memory_Usage": 14.0, //14 GB of RAM
  "Network_Traffic_Incoming": 50.0, //50 Mbps
  "Network_Traffic_Outgoing": 40.0, //40 Mbps
  "Disk_Read_Speed": 100.0, //100 MB/s
  "Disk_Write_Speed": 90.0, //90 MB/s
  "Heat": 75.0, //75° C.
  "Number_of_Processes": 150, //150 active processes
  "Server_Load_1min": 10.0, //Load Average 10.0
  "Network_Latency": 5.0, //5 milliseconds
  "Response_Time_per_KB_Data": 100.0, //100 ms per
    KB
  "Transactions_per_Second": 500, //500 transactions
    per second
  "Bandwidth_Usage": 2.0, //2 GB
  "Application_Response_Time": 200.0, //200 ms
  "Application_Throughput": 200.0, //200 requests per
    second
  "Disk_Read_Operations": 5000, //5000 read operations
    per second
  "Disk_Write_Operations": 4000, //4000 write opera-
    tions per second
  "Disk_IO_Operations_per_Second": 6000, //6000 IO
    operations per second
  "Network_Packets_Received_per_Second": 3000,
    //3000 packets per second
  "Network_Packets_Transmitted_per_Second": 2000,
    //2000 packets per second
  "Fan_Speed": 2000, //2000 RPM
  "Power_Consumption": 200, //200 Watts
  "Disk_Space_Usage": 400//400 GB used out of 500
    GB
}
//Function to get current CPU utilization
function getCPUUtilization( ):
  //Code to interact with system API to get current CPU
    usage
  currentCPUUsage=systemAPI.getCPUUsage( )
  return currentCPUUsage
//Function to get current memory usage
function getMemoryUsage( ):
  //Code to interact with system API to get current
    memory usage
  currentMemoryUsage=systemAPI.
    getMemoryUsage( )
  return currentMemoryUsage
//Function to get current incoming network traffic
function getNetworkTrafficIncoming( ):
  //Code to interact with network interface to get incom-
    ing traffic
  currentIncomingTraffic=networkInterface.
    getIncomingTraffic( )
  return currentIncomingTraffic
//Function to get current outgoing network traffic
function getNetworkTrafficOutgoing( ):
```

```
    //Code to interact with network interface to get outgoing traffic
    currentOutgoingTraffic=networkInterface.getOutgoingTraffic( )
    return currentOutgoingTraffic
//Function to get current disk read speed
function getDiskReadSpeed( ):
    //Code to interact with disk interface to get read speed
    currentReadSpeed=diskInterface.getReadSpeed( )
    return currentReadSpeed
//Function to get current disk write speed
function getDiskWriteSpeed( ):
    //Code to interact with disk interface to get write speed
    currentWriteSpeed=diskInterface.getWriteSpeed( )
    return currentWriteSpeed
//Function to get current Heat
function getHeat( ):
    //Code to interact with hardware sensors to get Heat
    currentHeat=hardwareSensors.getHeat( )
    return currentHeat
//Function to get current number of processes
function getNumberOfProcesses( ):
    //Code to interact with system API to get number of active processes
    currentProcessCount=systemAPI.getProcessCount( )
    return currentProcessCount
//Function to get current server load (1 min average)
function getServerLoad1min( ):
    //Code to interact with system API to get server load (1 min average)
    currentLoad1min=systemAPI.getLoadAverage(1)
    return currentLoad1min
//Function to get current network latency
function getNetworkLatency( ):
    //Code to interact with network tools to get current latency
    currentLatency=networkTools.getLatency( )
    return currentLatency
//Function to get current response time per KB of data
function getResponseTimePerKBData( ):
    //Code to measure response time per KB data processed
    currentResponseTimePerKB=performanceTools.getResponseTimePerKB( )
    return currentResponseTimePerKB
//Function to get current transactions per second
function getTransactionsPerSecond( ):
    //Code to measure current transactions per second
    currentTPS=transactionMonitor.getTransactionsPerSecond( )
    return currentTPS
//Function to get current bandwidth usage
function getBandwidthUsage( ):
    //Code to measure current bandwidth usage
    currentBandwidthUsage=networkInterface.getBandwidthUsage( )
    return currentBandwidthUsage
//Function to get current application response time
function getApplicationResponseTime( ):
    //Code to measure application response time
    currentAppResponseTime=appMonitor.getAppResponseTime( )
    return currentAppResponseTime
//Function to get current application throughput
function getApplicationThroughput( ):
    //Code to measure application throughput
    currentAppThroughput=appMonitor.getAppThroughput( )
    return currentAppThroughput
//Function to get current disk read operations
function getDiskReadOperations( ):
    //Code to measure disk read operations
    currentReadOps=diskInterface.getReadOperations( )
    return currentReadOps
//Function to get current disk write operations
function getDiskWriteOperations( ):
    //Code to measure disk write operations
    currentWriteOps=diskInterface.getWriteOperations( )
    return currentWriteOps
//Function to get current disk IO operations per second
function getDiskIOOperationsPerSecond( ):
    //Code to measure disk IO operations per second
    currentIOPS=diskInterface.getIOOperationsPerSecond( )
    return currentIOPS
//Function to get current network packets received per second
function getNetworkPacketsReceivedPerSecond( ):
    //Code to measure network packets received per second
    currentPacketsReceived=networkInterface.getPacketsReceivedPerSecond( )
    return currentPacketsReceived
//Function to get current network packets transmitted per second
function getNetworkPacketsTransmittedPerSecond( ):
    //Code to measure network packets transmitted per second
    currentPacketsTransmitted=networkInterface.getPacketsTransmittedPerSecond( )
    return currentPacketsTransmitted
//Function to get current fan speed
function getFanSpeed( ):
    //Code to interact with hardware sensors to get fan speed
    currentFanSpeed=hardwareSensors.getFanSpeed( )
    return currentFanSpeed
//Function to get current power consumption
function getPowerConsumption( ):
    //Code to measure power consumption
    currentPowerConsumption=powerMonitor.getPowerConsumption( )
    return currentPowerConsumption
//Function to get current disk space usage
function getDiskSpaceUsage( ):
    //Code to measure disk space usage
    currentDiskSpaceUsed=diskInterface.getDiskSpaceUsage( )
    return currentDiskSpaceUsed
//Function to collect all telemetry data
function collectTelemetryData( ):
    telemetryData={
        "CPU_Utilization": getCPUUtilization( ),
        "Memory_Usage": getMemoryUsage( ),
        "Network_Traffic_Incoming": getNetworkTrafficIncoming( ),
        "Network_Traffic_Outgoing": getNetworkTrafficOutgoing( ),
        "Disk_Read_Speed": getDiskReadSpeed( ),
        "Disk_Write_Speed": getDiskWriteSpeed( ),
        "Heat": getHeat( ),
        "Number_of_Processes": getNumberOfProcesses( ),
        "Server_Load_1min": getServerLoad1 min( ),
        "Network_Latency": getNetworkLatency( ),
        "Response_Time_per_KB_Data": getResponseTimePerKBData( ),
```

```
    "Transactions_per_Second": getTransactionsPerSecond( ),
    "Bandwidth_Usage": getBandwidthUsage( ),
    "Application_Response_Time": getApplicationResponseTime( ),
    "Application_Throughput": getApplicationThroughput( ),
    "Disk_Read_Operations": getDiskReadOperations( ),
    "Disk_Write_Operations": getDiskWriteOperations( ),
    "Disk_IO_Operations_per_Second": getDiskIOOperationsPerSecond( ),
  "Network_Packets_Received_per_Second": getNetworkPacketsReceivedPerSecond( ),
    "Network_Packets_Transmitted_per_Second": getNetworkPacketsTransmittedPerSecond( ),
    "Fan_Speed": getFanSpeed( ),
    "Power_Consumption": getPowerConsumption( ),
    "Disk_Space_Usage": getDiskSpaceUsage( )
  }
  return telemetryData
//Function to log telemetry data
function log TelemetryData(data):
  timestamp=getCurrentTimestamp( )
  log Entry={
    "timestamp": timestamp,
    "data": data
  }
  //Code to write log Entry to persistent storage
  writeTo Log(log Entry)
//Function to check telemetry data against thresholds and generate alerts
function checkAndAlert(data):
  alerts=[ ]
  foreach attribute, value in data:
    if value >thresholds [attribute]:
      alertMessage="Alert:"+attribute+"exceeds threshold with value"+value
      alerts.append(alertMessage)
  return alerts
//Function to send alerts to administrators
function sendAlerts(alerts):
  foreach alert in alerts:
    //Code to send alert message to administrators (e.g., via email, SMS, monitoring dashboard)
    sendAlertToAdmin(alert)
//Function to get the current timestamp
function getCurrentTimestamp( ):
  //Code to get the current system timestamp
  currentTimestamp=systemTime.getCurrentTime( )
  return currentTimestamp
//Function to write log entry to persistent storage
function writeTo Log(log Entry):
```

The foregoing first pseudocode can be understood as follows. The pseudocode begins by setting up a list of thresholds for different telemetry attributes. These thresholds are essential for determining when an alert should be triggered if any metric exceeds its predefined limit. For instance, CPU utilization might have a threshold of 80%, while memory usage might have a threshold of 14 GB. Other attributes include network traffic (both incoming and outgoing), disk read/write speeds, Heat, number of processes, server load, network latency, response time per KB of data, transactions per second, bandwidth usage, application response time, application throughput, disk read/write operations, disk I/O operations per second, network packets received/transmitted per second, fan speed, power consumption, and disk space usage. Setting these thresholds helps in identifying potential issues in real-time and ensuring that the system operates within safe limits.

The pseudocode defines several functions to collect specific telemetry data from the system. Each function interacts with a specific system API or hardware interface to retrieve the current value of a telemetry attribute. For example, 'getCPUUtilization( )' retrieves the current CPU usage from the system API, 'getMemoryUsage( )' retrieves the current memory usage from the system API, 'getNetworkTrafficIncoming( )' and 'getNetworkTrafficOutgoing( )' interact with the network interface to get the incoming and outgoing network traffic, respectively, 'getDiskReadSpeed( )' and 'getDiskWriteSpeed( )' interact with the disk interface to get the current read and write speeds, and 'getHeat( )' retrieves the current Heat from hardware sensors. Similar functions exist for other telemetry attributes like the number of processes, server load, network latency, response time per KB of data, transactions per second, bandwidth usage, application performance, disk operations, network packets, fan speed, power consumption, and disk space usage.

The 'collectTelemetryData( )' function aggregates all the telemetry data by calling each of the individual data collection functions. It stores the collected data in a dictionary called 'telemetryData' and returns it. This comprehensive data collection ensures that all relevant telemetry metrics are available for monitoring and analysis.

The 'log TelemetryData(data)' function is responsible for logging the collected telemetry data. It first retrieves the current system timestamp using the 'getCurrentTimestamp( )' function, which calls a method like 'systemTime.getCurrentTime( )' to get the accurate current time. Then, it creates a log entry containing the timestamp and the collected telemetry data. This log entry is written to persistent storage using the 'writeTo Log(log Entry)' function. This logging mechanism ensures that a historical record of telemetry data is maintained, which can be useful for future analysis and troubleshooting.

The 'checkAndAlert(data)' function checks the collected telemetry data against the predefined thresholds. For each attribute in the telemetry data, if the value exceeds the corresponding threshold, an alert message is generated. This message indicates that a specific attribute has exceeded its threshold value. The alert message is added to a list of alerts. This function ensures that any threshold violations are detected and flagged, allowing for immediate action.

The 'sendAlerts(alerts)' function sends the generated alerts to system administrators. It iterates through the list of alert messages and sends each alert using a hypothetical method 'sendAlertToAdmin(alert)', which could send alerts via various channels such as email, SMS, or a monitoring dashboard. The alerting mechanism ensures that administrators are promptly notified of any potential issues, enabling them to take corrective actions quickly.

The 'getCurrentTimestamp( )' function retrieves the current system timestamp by calling a method like 'systemTime.getCurrentTime( )'. This timestamp is used for logging purposes to ensure that each log entry is accurately timestamped. Accurate timestamps are crucial for correlating events and understanding the sequence of occurrences in the system.

The 'runMonitoringSystem( )' function is the main loop that continuously runs the monitoring system. In each iteration of the loop, the function collects telemetry data by calling the 'collectTelemetryData( )' function. It logs the collected telemetry data using the 'log TelemetryData(data)' function. It checks the telemetry data against thresholds and generates alerts by calling the 'checkAndAlert(data)' function. If there are any alerts, it sends them to administrators using the 'sendAlerts(alerts)' function. The loop pauses for one second before repeating the process to avoid overwhelming the system with too frequent checks.

The loop ensures continuous real-time monitoring of the system's performance. By constantly collecting, logging, and analyzing telemetry data, the system can quickly identify and respond to potential issues, maintaining optimal performance and preventing significant problems. The one-second pause between iterations helps balance the need for timely monitoring with the need to avoid excessive resource consumption. The monitoring system starts by calling the 'runMonitoringSystem( )' function, which initiates the continuous monitoring process.

Thus, the first pseudocode provides a comprehensive framework for real-time monitoring and alerting. It includes functions for collecting telemetry data, logging the data, checking against thresholds, generating alerts, and sending notifications to administrators. The main monitoring loop ensures continuous and timely monitoring of the system's performance, allowing for quick identification and resolution of potential issues. This framework helps maintain system reliability and performance, providing administrators with the information they need to manage and troubleshoot the system effectively.

The second pseudocode for the second technical solution that focuses on predictive anomaly detection using machine learning models trained on historical and real-time telemetry data can be implemented as follows.

```
//Initialization of thresholds for anomaly detection
anomalyThresholds={
  "CPU_Utilization": 0.8, //80% CPU usage
  "Memory_Usage": 14.0, //14 GB of RAM
  "Network_Traffic_Incoming": 50.0, //50 Mbps
  "Network_Traffic_Outgoing": 40.0, //40 Mbps
  "Disk_Read_Speed": 100.0, //100 MB/s
  "Disk_Write_Speed": 90.0, //90 MB/s
  "Heat": 75.0, //75° C.
  "Number_of_Processes": 150, //150 active processes
  "Server_Load_1min": 10.0, //Load Average 10.0
  "Network_Latency": 5.0, //5 milliseconds
  "Response_Time_per_KB_Data": 100.0, //100 ms per KB
  "Transactions_per_Second": 500, //500 transactions per second
  "Bandwidth_Usage": 2.0, //2 GB
  "Application_Response_Time": 200.0, //200 ms
  "Application_Throughput": 200.0, //200 requests per second
  "Disk_Read_Operations": 5000, //5000 read operations per second
  "Disk_Write_Operations": 4000, //4000 write operations per second
  "Disk_IO_Operations_per_Second": 6000, //6000 IO operations per second
  "Network_Packets_Received_per_Second": 3000, //3000 packets per second
  "Network_Packets_Transmitted_per_Second": 2000, //2000 packets per second
  "Fan_Speed": 2000, //2000 RPM
  "Power_Consumption": 200, //200 Watts
  "Disk_Space_Usage": 400//400 GB used out of 500 GB
}
//Function to get current telemetry data
function collectTelemetryData( )
  telemetryData={
    "CPU_Utilization": getCPUUtilization( ),
    "Memory_Usage": getMemoryUsage( ),
    "Network_Traffic_Incoming": getNetworkTrafficIncoming( ),
    "Network_Traffic_Outgoing": getNetworkTrafficOutgoing( ),
    "Disk_Read_Speed": getDiskReadSpeed( ),
    "Disk_Write_Speed": getDiskWriteSpeed( ),
    "Heat": getHeat( ),
    "Number_of_Processes": getNumberOfProcesses( ),
    "Server_Load_1min": getServerLoad1min( ),
    "Network_Latency": getNetworkLatency( ),
    "Response_Time_per_KB_Data": getResponseTimePerKBData( ),
    "Transactions_per_Second": getTransactionsPerSecond( ),
    "Bandwidth_Usage": getBandwidthUsage( ),
    "Application_Response_Time": getApplicationResponseTime( ),
    "Application_Throughput": getApplicationThroughput( ),
    "Disk_Read_Operations": getDiskReadOperations( ),
    "Disk_Write_Operations": getDiskWriteOperations( ),
    "Disk_IO_Operations_per_Second": getDiskIOOperationsPerSecond( ),
    "Network_Packets_Received_per_Second": getNetworkPacketsReceivedPerSecond( ),
    "Network_Packets_Transmitted_per_Second": getNetworkPacketsTransmittedPerSecond( ),
    "Fan_Speed": getFanSpeed( ),
    "Power_Consumption": getPowerConsumption( ),
    "Disk_Space_Usage": getDiskSpaceUsage( )
  }
  return telemetryData
//Function to preprocess the telemetry data
function preprocessData(data):
  //Handle missing values
  data=handleMissingValues(data)
  //Normalize data
  data=normalizeData(data)
  //Smooth outliers
  data=smoothOutliers(data)
  return data
//Function to handle missing values in the data
function handleMissingValues(data):
  foreach attribute, value in data:
    if value==null:
      data[attribute]=getDefault(attribute)
  return data
//Function to normalize the data
function normalizeData(data):
  foreach attribute, value in data:
    data[attribute]=(value-getMin(attribute))/(getMax(attribute)-getMin(attribute))
  return data
//Function to smooth outliers in the data
function smoothOutliers(data):
  foreach attribute, value in data:
    if value >(getMean(attribute)+3*getStdDev(attribute)):
      data[attribute]=getMean(attribute)+3*getStdDev(attribute)
```

```
    elif value <(getMean(attribute)−3*getStdDev(attribute)):
      data[attribute]=getMean(attribute)−3*getStdDev(attribute)
  return data
//Function to perform feature engineering on the telemetry data
function performFeatureEngineering(data):
  //Calculate moving averages
  data=calculateMovingAverages(data)
  //Calculate trend lines
  data=calculateTrendLines(data)
  //Create interaction terms between different metrics
  data=createInteractionTerms(data)
  return data
//Function to calculate moving averages
function calculateMovingAverages(data):
  foreach attribute, value in data:
    data["MA_"+attribute]=calculateMovingAverage(attribute, value)
  return data
//Function to calculate trend lines
function calculateTrendLines(data):
  foreach attribute, value in data:
    data["Trend_"+attribute]=calculateTrendLine(attribute, value)
  return data
//Function to create interaction terms between different metrics
function createInteractionTerms(data):
  attributes=data.keys( )
  for i in range(0, len(attributes)):
    for j in range(i+1, len(attributes)):
      data["Interaction_"+attributes[i]+"_"+attributes[j]]=data[attributes[i]]*data[attributes[j]]
  return data
//Function to train the machine learning model
function trainModel(trainingData):
  //Define the model (e.g., random forest, neural network)
  model=defineModel( )
  //Train the model using the training data
  model.fit(trainingData.features, trainingData.labels)
  return model
//Function to define the machine learning model
function defineModel( ):
  //Example using a random forest model
  model=RandomForestClassifier(n_estimators=100)
  return model
//Function to validate the machine learning model
function validateModel(model, validationData):
  //Predict on the validation data
  predictions=model.predict(validationData.features)
  //Calculate validation metrics (e.g., precision, recall, F1 score)
  metrics=calculateValidationMetrics(predictions, validationData.labels)
  return metrics
//Function to calculate validation metrics
function calculateValidationMetrics(predictions, labels):
  precision=calculatePrecision(predictions, labels)
  recall=calculateRecall(predictions, labels)
  f1_score=calculateF1Score(precision, recall)
  return {"precision": precision, "recall": recall, "f1_score": f1_score}
//Function to calculate precision
function calculatePrecision(predictions, labels):
  true_positives=sum((predictions==1) & (labels==1))
  false_positives=sum((predictions==1) & (labels==0))
  precision=true_positives/(true_positives+false_positives)
  return precision
//Function to calculate recall
function calculateRecall(predictions, labels):
  true_positives=sum((predictions==1) & (labels==1))
  false_negatives=sum((predictions==0) & (labels==1))
  recall=true_positives/(true_positives+false_negatives)
  return recall
//Function to calculate F1 score
function calculateF1Score(precision, recall):
  f1_score=2*(precision*recall)/(precision+recall)
  return f1_score
//Function to make predictions using the trained model
function predict(model, data):
  processedData=preprocessData(data)
  engineeredData=performFeatureEngineering(processedData)
  predictions=model.predict(engineeredData.features)
  return predictions
//Function to check predictions against anomaly thresholds and generate alerts
function checkPredictionsAndAlert(predictions):
  alerts=[ ]
  foreach attribute, value in predictions:
    if value >anomalyThresholds[attribute]:
      alertMessage="Anomaly detected:"+attribute+"exceeds threshold with value"+value
      alerts.append(alertMessage)
  return alerts
//Function to send alerts to administrators
function sendAlerts(alerts):
  foreach alert in alerts:
    //Code to send alert message to administrators (e.g., via email, SMS, monitoring dashboard)
    sendAlertToAdmin(alert)
//Main function to run the predictive anomaly detection system
function runAnomalyDetectionSystem( ):
  //Load historical data for training
  historicalData=loadHistoricalData( )
  //Preprocess historical data
  preprocessedHistoricalData=preprocessData(historicalData)
  //Perform feature engineering on historical data
  engineeredHistoricalData=performFeatureEngineering(preprocessedHistoricalData)
  //Split historical data into training and validation sets
  trainingData, validationData=splitData(engineeredHistoricalData)
  //Train the machine learning model
  model=trainModel(trainingData)
  //Validate the machine learning model
  validationMetrics=validateModel(model, validationData)
  print("Validation metrics:", validationMetrics)
  //Continuously monitor real-time telemetry data
  while true:
    //Collect real-time telemetry data
    telemetryData=collectTelemetryData( )
    //Preprocess the real-time telemetry data
    preprocessedTelemetryData=preprocessData(telemetryData)
    //Perform feature engineering on the preprocessed telemetry data
```

```
engineeredTelemetryData=
  performFeatureEngineering(preprocessedTelemetryData)
//Make predictions using the trained model
predictions=model.predict(engineeredTelemetryData.features)
//Check predictions against anomaly thresholds and
  generate alerts
alerts=checkPredictionsAndAlert(predictions)
//Send alerts if there are any anomalies
if alerts.length >0:
  sendAlerts(alerts)
//Pause for a specified interval before the next iteration
sleep(1)//Pause for 1 second
```

As illustrated above, the second pseudocode for the second technical solution focuses on predictive anomaly detection using machine learning models. The pseudocode for this solution includes several functions and routines designed to collect, preprocess, analyze, and use telemetry data to predict anomalies. Here is a detailed explanation of each function and routine within the pseudocode:

Initialization of Anomaly Thresholds: The pseudocode starts by setting up a list of thresholds for different telemetry attributes. These thresholds are used to determine if an anomaly has occurred based on the values predicted by the machine learning model. For example, thresholds are set for CPU utilization, memory usage, network traffic (both incoming and outgoing), disk read/write speeds, Heat, number of processes, server load, network latency, response time per KB of data, transactions per second, bandwidth usage, application response time, application throughput, disk read/write operations, disk I/O operations per second, network packets received/transmitted per second, fan speed, power consumption, and disk space usage.

Telemetry Data Collection: The collectTelemetryData( ) function is responsible for gathering current telemetry data from various sources. This function calls specific routines to fetch data for different attributes like CPU utilization, memory usage, network traffic, disk performance, Heat, process count, server load, network latency, response time, transaction rate, bandwidth usage, application performance, and hardware metrics. Each of these sub-functions interacts with system APIs or hardware interfaces to obtain the current value of the respective attribute.

Preprocessing Telemetry Data: The preprocessData( ) function prepares the collected telemetry data for analysis. This involves handling missing values, normalizing the data, and smoothing outliers.

a. Handling Missing Values: If any telemetry attribute value is missing, the handleMissingValues( ) routine assigns a default value or uses interpolation methods to estimate the missing value.

b. Normalizing Data: The normalizeData( ) routine adjusts the scale of the data to a common range, typically between 0 and 1. This is done to ensure that different attributes can be compared and processed consistently.

c. Smoothing Outliers: The smoothOutliers( ) routine identifies and reduces the impact of extreme values that could distort the analysis. It uses statistical methods to smooth out values that deviate significantly from the mean.

Feature Engineering: The performFeatureEngineering( ) function creates new features from the raw telemetry data to enhance the performance of the machine learning model. This includes calculating moving averages, trend lines, and interaction terms between different metrics.

a. Calculating Moving Averages: The calculateMovingAverages( ) routine computes the average of a metric over a specified time window, helping to identify trends and smooth short-term fluctuations.

b. Calculating Trend Lines: The calculateTrendLines( ) routine fits a trend line to the data to highlight the underlying direction of the metrics over time.

c. Creating Interaction Terms: The createInteractionTerms( ) routine generates new features by combining multiple attributes. These interaction terms can reveal complex relationships between metrics that are not apparent from individual attributes alone.

Model Training: The trainModel( ) function defines and trains a machine learning model using historical telemetry data. This involves splitting the data into training and validation sets, fitting the model to the training data, and evaluating its performance on the validation data.

a. Defining the Model: The defineModel( ) routine specifies the type of machine learning model to be used (e.g., random forest, neural network). The chosen model is then instantiated.

b. Training the Model: The trainModel( ) function fits the model to the training data by adjusting its parameters to minimize prediction errors. This involves using techniques like gradient descent for neural networks or building decision trees for random forests.

Model Validation: The validateModel( ) function assesses the performance of the trained model using a separate validation dataset.

a. Prediction on Validation Data: The model makes predictions on the validation data, which is then compared to the actual values to calculate various performance metrics.

b. Calculating Validation Metrics: The calculateValidationMetrics( ) routine computes metrics such as precision, recall, and F1 score. Precision measures the proportion of true positive predictions out of all positive predictions, recall measures the proportion of true positives out of all actual positives, and the F1 score is the harmonic mean of precision and recall.

Making Predictions: The predict( ) function applies the trained model to new, real-time telemetry data to predict potential anomalies. This function preprocesses the new data, performs feature engineering, and then uses the model to make predictions.

Checking Predictions Against Thresholds: The checkPredictionsAndAlert( ) function compares the model's predictions with the predefined anomaly thresholds. If a prediction exceeds its corresponding threshold, an alert is generated. This involves iterating through each attribute and checking if its predicted value is above the anomaly threshold.

Sending Alerts: The sendAlerts( ) function notifies administrators of any anomalies detected by the model. This can involve sending alert messages through various channels such as email, SMS, or a monitoring dashboard. Each alert contains information about the specific attribute and the predicted value that exceeded the threshold.

Main Anomaly Detection Loop: The runAnomalyDetectionSystem( ) function is the main loop that continuously monitors the system in real-time. It starts by loading and preprocessing historical data, performing feature engineering, and splitting the data into training and validation sets. The model is then trained and validated. In the continuous loop, the function collects real-time telemetry data, preprocesses and engineers the data, makes predictions using the trained model, checks the predictions against thresholds, and sends alerts if anomalies are detected. The loop pauses for a short interval (e.g., one second) between iterations to ensure continuous monitoring without overwhelming the system. More specifically, it can be understood as follows:

a. Load Historical Data for Training: The loop begins by loading historical telemetry data, which is used to train the machine learning model. This historical data is essential for creating a robust model that can predict anomalies accurately.
b. Preprocess Historical Data: The loaded historical data is preprocessed to handle missing values, normalize the data, and smooth outliers. This step ensures that the data is clean and suitable for training the machine learning model.
c. Perform Feature Engineering on Historical Data: Feature engineering is performed on the preprocessed historical data to create new features that enhance the model's predictive capabilities. This includes calculating moving averages, trend lines, and interaction terms between different metrics.
d. Split Historical Data into Training and Validation Sets: The engineered historical data is split into training and validation sets. The training set is used to train the machine learning model, while the validation set is used to evaluate its performance.
e. Train the Machine Learning Model: The machine learning model is defined and trained using the training data. The model learns the patterns and relationships within the data that are indicative of normal and anomalous behavior.
f. Validate the Machine Learning Model: The trained model is validated using the validation data to assess its performance. Validation metrics such as precision, recall, and F1 score are calculated to ensure the model's accuracy and reliability.
g. Continuous Monitoring of Real-Time Telemetry Data: The main loop continuously monitors real-time telemetry data. It begins by collecting real-time telemetry data from various sources.
h. Preprocess Real-Time Telemetry Data: The collected real-time telemetry data is preprocessed to handle missing values, normalize the data, and smooth outliers, similar to the historical data preprocessing step.
i. Perform Feature Engineering on Preprocessed Telemetry Data: Feature engineering is performed on the preprocessed real-time telemetry data to create new features. This step ensures that the data used for making predictions has the same structure as the data used to train the model.
j. Make Predictions Using the Trained Model: The trained machine learning model is used to make predictions on the engineered real-time telemetry data. These predictions indicate whether any anomalies are present in the data.
k. Check Predictions Against Anomaly Thresholds and Generate Alerts: The predictions are checked against predefined anomaly thresholds. If any predicted value exceeds its corresponding threshold, an alert is generated. This step ensures that potential issues are detected early.
l. Send Alerts if There Are Any Anomalies: If any anomalies are detected, alerts are sent to administrators. These alerts contain information about the specific attribute and the predicted value that exceeded the threshold.
m. Pause for a Specified Interval: The loop pauses for a short interval (e.g., one second) before repeating the process. This pause ensures continuous monitoring without overwhelming the system with too frequent checks.

This detailed explanation outlines the entire process of implementing predictive anomaly detection using machine learning models, covering data collection, preprocessing, feature engineering, model training, validation, prediction, and alerting.

The foregoing pseudocode examples can be integrated together in whole or in part as desired. For example, the integration of the first and second technical solutions could combine real-time monitoring and alerting with predictive anomaly detection using machine learning. This unified approach leverages the strengths of both solutions to provide comprehensive monitoring, immediate alerts, and predictive insights.

First, a unified data collection mechanism is implemented to gather telemetry data once and provide it to both the real-time monitoring system and the predictive anomaly detection system. This ensures that both systems work with the same set of telemetry data, maintaining consistency and reducing redundancy.

Next, common functions for preprocessing and feature engineering are used to ensure that both systems handle data consistently. Preprocessing steps such as handling missing values, normalizing data, and smoothing outliers are shared between the two systems. Similarly, feature engineering processes like calculating moving averages, trend lines, and generating interaction terms are performed once and utilized by both systems.

A combined alerting mechanism is then implemented to consolidate alerts from both real-time threshold checks and machine learning predictions. This unified alerting system ensures that administrators receive comprehensive alerts covering both immediate issues detected by the real-time monitoring system and predicted anomalies identified by the machine learning model.

The main monitoring loop is designed to perform real-time monitoring and predictive analysis in parallel. This involves collecting real-time telemetry data, logging the data, and performing real-time threshold checks to generate immediate alerts if any metric exceeds its predefined threshold. Simultaneously, the collected data is preprocessed, engineered, and fed into the trained machine learning model to make predictions about potential anomalies. These predictions are then checked against anomaly thresholds to generate predictive alerts.

To maintain system performance and avoid overwhelming the system with frequent checks, the loop includes a short pause between iterations. This allows the system to continuously monitor and analyze data while balancing resource consumption.

By integrating real-time monitoring with predictive anomaly detection, the system provides a robust solution that can quickly identify and respond to current issues while also predicting and preventing potential future problems. This comprehensive approach enhances system reliability, performance, and overall operational efficiency, providing administrators with timely and actionable insights.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for real-time anomaly prediction comprising the steps of:

collecting, by a sensor, telemetry data from various infrastructure components, including firewalls, switches, servers, and storage devices, capturing metrics including CPU usage, memory consumption, network traffic, and error rates;

logging, by a logging system, the collected telemetry data in real-time to create a continuous record of the telemetry data;

extracting, by a data extraction module, the logged telemetry data from the real-time log for further analysis and processing;

analyzing, by a data analysis module, the extracted telemetry data to identify patterns, trends, and any existing anomalies in the data;

cleaning, by a data cleaning module, the telemetry data to remove noise, irrelevant information, and errors, including handling missing values, smoothing outliers, and normalizing data;

performing feature engineering, by a feature engineering module, on the cleaned telemetry data to create or modify features that enhance the performance of a machine learning model, including calculating moving averages, trend lines, or interaction terms between different metrics;

calculating, by a calculation module, a weighted mean of a plurality of previous telemetry data values, wherein weights are the inverse of a distance from current time, to provide a baseline value for extrapolation;

computing, by a computation module, first-order differences between consecutive previous telemetry data values and the weighted mean to determine variation from the previous value and its own trends, wherein the weights are the inverse of the distance from the current time, capturing immediate changes in the data;

computing, by the computation module, second-order differences between consecutive previous telemetry data values and the weighted mean to determine the variation in the rate of change and its own trends, wherein the weights are the inverse of the distance from the current time, capturing acceleration or deceleration in the data trends;

adjusting, by an adjustment module, the extrapolated value for the current time based on the first-order and second-order differences to fine-tune the predicted value, ensuring it accurately reflects a current state of the infrastructure components;

integrating, by a data integration module, the adjusted extrapolated value into a dataset to create a continuous telemetry data stream, maintaining the integrity and continuity of the data for further analysis;

validating, by a validation module, extrapolated telemetry data by comparing it with actual telemetry data once it becomes available, assessing accuracy of the extrapolation process and making necessary adjustments to improve future predictions;

training, by a machine learning model, the machine learning model using the validated telemetry data to learn underlying patterns and improve its predictive capabilities;

testing, by a testing module, the trained machine learning model to evaluate its performance using a separate validation dataset, ensuring the model generalizes well to new, unseen data;

assessing, by an accuracy assessment module, the accuracy of the machine learning model using metrics such as precision, recall, F1 score, or mean absolute error to determine the model's performance and reliability;

adjusting, by a hyperparameter adjustment module, hyperparameters of the machine learning model if a desired accuracy is not achieved, optimizing the model's performance through iterative fine-tuning of parameters such as learning rate, number of layers, or number of trees in a random forest;

tuning, by a data tuning module, the telemetry data to improve model performance, including feature selection, feature scaling, and creating synthetic data to balance the dataset;

finalizing, by a model finalization module, the machine learning model once the desired accuracy is achieved, fixing model parameters and preparing it for deployment; and classifying, by the finalized machine learning model, anomalies in the telemetry data to predict whether a given data point represents a normal state or an anomaly, enabling timely detection and response to potential issues.

2. The method of claim 1, wherein the telemetry data collected by the sensor includes additional metrics including disk usage, I/O operations, and latency from the infrastructure components.

3. The method of claim 2, wherein the data cleaning module is further configured to handle missing values using k-nearest neighbors imputation, multiple imputation by chained equations (MICE), or deep learning-based imputation models.

4. The method of claim 3, wherein the feature engineering module is further configured to create composite features that capture interactions between multiple metrics, including CPU-memory interaction terms or network-disk usage correlation features.

5. The method of claim 4, wherein the calculation module is further configured to compute the weighted mean using a dynamically adjustable window size based on variability of the telemetry data, ensuring the weighted mean adapts to changing data patterns.

6. The method of claim 5, wherein the computation module is further configured to compute first-order differences using a robust differencing technique that minimizes impact of outliers and noisy data points.

7. The method of claim 6, wherein the computation module is further configured to compute second-order differences using a smoothing algorithm to capture long-term trends and reduce influence of short-term fluctuations.

8. The method of claim 7, wherein the adjustment module is further configured to incorporate higher-order differences if necessary, to capture more complex patterns and behaviors in the telemetry data, providing a more accurate extrapolated value.

9. The method of claim 8, wherein the validation module is further configured to use a feedback loop to continuously improve weighting mechanisms and extrapolation parameters based on the validation results, ensuring system adaptation to evolving data patterns.

10. The method of claim 9, wherein the classification by the finalized machine learning model further includes generating detailed reports and alerts, and triggering automated incident response actions based on the classification results, to prevent potential operational and reputational losses and ensure continuous monitoring and protection of the infrastructure components.

11. A system for real-time anomaly prediction comprising:

a plurality of sensors configured to collect telemetry data from various infrastructure components including firewalls, switches, servers, and storage devices, capturing metrics including CPU usage, memory consumption, network traffic, and error rates;

a logging system configured to log the collected telemetry data in real-time to create a continuous record of the telemetry data;

a data extraction module configured to extract the logged telemetry data from the real-time log for further analysis and processing;

a data analysis module configured to analyze the extracted telemetry data to identify patterns, trends, and any existing anomalies in the data;

a data cleaning module configured to clean the telemetry data to remove noise, irrelevant information, and errors, including handling missing values, smoothing outliers, and normalizing data;

a feature engineering module configured to perform feature engineering on the cleaned telemetry data to create or modify features that enhance the performance of a machine learning model, including calculating moving averages, trend lines, or interaction terms between different metrics;

a calculation module configured to calculate a weighted mean of a plurality of previous telemetry data values, wherein weights are the inverse of a distance from current time, to provide a baseline value for extrapolation;

a computation module configured to compute first-order differences between consecutive previous telemetry data values and the weighted mean to determine variation from the previous value and its own trends, wherein the weights are the inverse of the distance from the current time, capturing immediate changes in the data;

the computation module further configured to compute second-order differences between consecutive previous telemetry data values and the weighted mean to determine the variation in the rate of change and its own trends, wherein the weights are the inverse of the distance from the current time, capturing acceleration or deceleration in the data trends;

an adjustment module configured to adjust the extrapolated value for the current time based on the first-order and second-order differences to fine-tune the predicted value, ensuring it accurately reflects a current state of the infrastructure components;

a data integration module configured to integrate the adjusted extrapolated value into a dataset to create a continuous telemetry data stream, maintaining the integrity and continuity of the data for further analysis;

a validation module configured to validate extrapolated telemetry data by comparing it with actual telemetry data once it becomes available, assessing accuracy of the extrapolation process and making necessary adjustments to improve future predictions;

a machine learning model configured to be trained using the validated telemetry data to learn underlying patterns and improve its predictive capabilities;

a testing module configured to test the trained machine learning model to evaluate its performance using a separate validation dataset, ensuring the model generalizes well to new, unseen data;

an accuracy assessment module configured to assess the accuracy of the machine learning model using metrics such as precision, recall, F1 score, or mean absolute error to determine the model's performance and reliability;

a hyperparameter adjustment module configured to adjust hyperparameters of the machine learning model if a desired accuracy is not achieved, optimizing the model's performance through iterative fine-tuning of parameters such as learning rate, number of layers, or number of trees in a random forest;

a data tuning module configured to tune the telemetry data to improve model performance, including feature selection, feature scaling, and creating synthetic data to balance the dataset;

a model finalization module configured to finalize the machine learning model once the desired accuracy is achieved, fixing model parameters and preparing it for deployment; and the finalized machine learning model further configured to classify anomalies in the telemetry data to predict whether a given data point represents a normal state or an anomaly, enabling timely detection and response to potential issues.

12. The system of claim 11, wherein the sensors are further configured to collect additional telemetry metrics including disk usage, I/O operations, and latency from the infrastructure components.

13. The system of claim 12, wherein the data cleaning module is further configured to handle missing values using advanced imputation techniques of k-nearest neighbors imputation, multiple imputation by chained equations (MICE), or deep learning-based imputation models.

14. The system of claim 13, wherein the feature engineering module is further configured to create composite features that capture interactions between multiple metrics, including CPU-memory interaction terms and network-disk usage correlation features.

15. The system of claim 14, wherein the calculation module is further configured to compute the weighted mean using a dynamically adjustable window size based on variability of the telemetry data, ensuring the weighted mean adapts to changing data patterns.

16. The system of claim 15, wherein the computation module is further configured to compute first-order differences using a robust differencing technique that minimizes impact of outliers and noisy data points.

17. The system of claim 16, wherein the computation module is further configured to compute second-order differences using a smoothing algorithm to capture long-term trends and reduce influence of short-term fluctuations.

18. The system of claim 17, wherein the adjustment module is further configured to incorporate higher-order differences if necessary, to capture more complex patterns and behaviors in the telemetry data, providing a more accurate extrapolated value.

19. The system of claim 18, wherein the validation module is further configured to use a feedback loop to continuously improve weighting mechanisms and extrapolation parameters based on the validation results, ensuring system adaptation to evolving data patterns.

20. A method for real-time anomaly prediction comprising:

collecting, by a sensor, telemetry data from various infrastructure components;

logging, by a logging system, the collected telemetry data in real-time;

extracting, by a data extraction module, the logged telemetry data from the real-time log;

analyzing, by a data analysis module, the extracted telemetry data to identify patterns and anomalies;

cleaning, by a data cleaning module, the telemetry data to remove noise and errors;

performing feature engineering, by a feature engineering module, on the cleaned telemetry data;

calculating, by a calculation module, a weighted mean of previous telemetry data values, wherein weights are the inverse of a distance from current time;

computing, by a computation module, first-order differences between previous telemetry data values and the weighted mean to determine variation from the previous value and its own trends;

computing, by the computation module, second-order differences between previous telemetry data values and the weighted mean to determine the variation in rate of change and its own trends;

adjusting, by an adjustment module, an extrapolated value for the current time based on the first-order and second-order differences;

integrating, by a data integration module, the adjusted extrapolated value into a dataset to create a continuous telemetry data stream;

validating, by a validation module, extrapolated telemetry data by comparing it with actual telemetry data once it becomes available;

training, by a machine learning model, the machine learning model using the validated telemetry data;

testing, by a testing module, the trained machine learning model to evaluate its performance;

assessing, by an accuracy assessment module, the accuracy of the machine learning model;

adjusting, by a hyperparameter adjustment module, hyperparameters of the machine learning model;

tuning, by a data tuning module, the telemetry data to improve model performance;

finalizing, by a model finalization module, the machine learning model; and classifying, by the finalized machine learning model, anomalies in the telemetry data.

* * * * *